(12) United States Patent
Hsin et al.

(10) Patent No.: US 7,839,732 B2
(45) Date of Patent: Nov. 23, 2010

(54) SYSTEM AND METHOD FOR CALIBRATING RECORDING TRACK OFFSET OF OPTICAL STORAGE DEVICE

(75) Inventors: Kuo-Ting Hsin, Hsin-Chu Hsien (TW); Ming-Hsien Tsai, Kao-Hsiung (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 393 days.

(21) Appl. No.: 12/046,458

(22) Filed: Mar. 12, 2008

(65) Prior Publication Data

US 2008/0253248 A1 Oct. 16, 2008

Related U.S. Application Data

(63) Continuation-in-part of application No. 11/735,445, filed on Apr. 14, 2007, now Pat. No. 7,663,987.

(51) Int. Cl.
*G11B 7/00* (2006.01)
(52) U.S. Cl. .............. 369/44.29; 369/44.26; 369/44.34; 369/44.35; 369/53.28
(58) Field of Classification Search .............. 369/44.29, 369/44.35, 44.26, 44.27, 53.2, 44.31, 44.34, 369/53.28
See application file for complete search history.

(56) References Cited

U.S. PATENT DOCUMENTS

| 4,786,849 | A |   | 11/1988 | Tateishi       |            |
|-----------|---|---|---------|----------------|------------|
| 5,077,719 | A | * | 12/1991 | Yanagi et al.  | 369/44.29  |
| 5,220,546 | A | * | 6/1993  | Fennema        | 369/44.35  |
| 5,251,194 | A | * | 10/1993 | Yoshimoto et al. | 369/44.26 |
| 5,343,454 | A | * | 8/1994  | Watanabe et al. | 369/44.29 |
| 5,504,726 | A | * | 4/1996  | Semba          | 369/44.29  |
| 5,568,461 | A |   | 10/1996 | Nishiuchi      |            |
| 5,731,924 | A |   | 3/1998  | Yun            |            |
| 5,862,112 | A |   | 1/1999  | Nagai et al.   |            |
| 5,933,410 | A |   | 8/1999  | Nakane et al.  |            |
| 6,172,960 | B1| * | 1/2001  | Takemura et al.| 369/275.3  |
| 6,407,968 | B1|   | 6/2002  | Nakata et al.  |            |
| 6,434,096 | B1|   | 8/2002  | Akagi          |            |
| 6,452,879 | B1|   | 9/2002  | Tsukahara      |            |
| 6,526,006 | B1| * | 2/2003  | Yoshimi et al. | 369/44.28  |
| 6,731,573 | B2|   | 5/2004  | Takeda         |            |
| 6,839,310 | B2|   | 1/2005  | Yoshida        |            |

(Continued)

FOREIGN PATENT DOCUMENTS

| CN | 1932992   | 3/2007 |
| CN | 101341534 | 1/2009 |
| EP | 0543295   | 5/1993 |

*Primary Examiner*—Thang V Tran
(74) *Attorney, Agent, or Firm*—Winston Hsu; Scott Margo

(57) ABSTRACT

A system and method for calibrating a recording track offset of an optical storage device accessing an optical storage medium of land/groove type. The system includes: a tracking servo loop arranged to control tracking operations of an optical head of the optical storage device; a track offset control loop arranged to control the recording track offset for the tracking servo loop; a controller arranged to enable a latest value of the recording track offset to be a readout value for utilization in a recording process performed later; and a comparator arranged to compare a recording length with a threshold value and generate a flag to represent whether the recording length is a long recording length, wherein the latest value is derived from the track offset control loop.

26 Claims, 21 Drawing Sheets

U.S. PATENT DOCUMENTS

| | | |
|---|---|---|
| 6,975,566 B2 | 12/2005 | Park |
| 2002/0105896 A1* | 8/2002 | Kusumoto et al. .......... 369/125 |
| 2004/0125713 A1* | 7/2004 | Takahashi et al. ........ 369/44.36 |
| 2007/0076545 A1 | 4/2007 | Doi |
| 2008/0094975 A1 | 4/2008 | Lee |
| 2008/0316877 A1 | 12/2008 | Wisse |
| 2009/0296546 A1 | 12/2009 | Doi |

* cited by examiner

SYSTEM AND METHOD FOR CALIBRATING RECORDING TRACK OFFSET OF OPTICAL STORAGE DEVICE

CROSS REFERENCE TO RELATED APPLICATIONS

This application is a continuation-in-part application and claims the benefit of U.S. application Ser. No. 11/735,445, which was filed on Apr. 14, 2007, and entitled "METHOD AND SYSTEM FOR CALIBRATING RECORDING TRACK OFFSET OF OPTICAL STORAGE DEVICE".

BACKGROUND

The present invention relates to track offset calibration of an optical storage device, and more particularly, to systems and methods for calibrating a recording track offset of an optical storage device accessing an optical storage medium of a land and groove recording/reproduction type.

Regarding a digital versatile disc (DVD) such as a DVD-Recordable (DVD-R) disc, accurately controlling a track offset of an optical head of a DVD drive during recoding data onto the DVD-R disc is not so important to the recording quality thereof since no obvious problem would occur even if the laser light spot emitted from the optical head is not locked at the center of a groove track of the DVD-R disc. However, regarding a DVD-RAM disc, if the laser light spot emitted from the optical head is not locked at the center of a second track of the DVD-RAM disc while the DVD drive is recording data on the second track, data previously written on a first track adjacent to the second track would probably be erased or overwritten, typically causing a large jitter value that represents poor recording quality. In the worst case, at least a portion of the data on the DVD-RAM disc becomes unreadable.

For example, the second track is a groove track 21G centered at line (b) as shown in FIG. 1, where address blocks 16 to 19 are indicated as ID1 to ID4, respectively. If the laser light spot 24 scans along line (a) while the DVD drive is recording data on the groove track 21G, the data previously written on the first track, which is the land track 21L adjacent to the groove track 21G in this situation, would be damaged. If the laser light spot 24 scans along line (c) while the DVD drive is recording data on the groove track 21G, the data previously written on the first track, which is the land track 22L adjacent to the groove track 21G in this situation, would be damaged.

Sometimes, a typical value of the recording track offset (the track offset in a recording process) would be different from a typical value of the reading track offset (the track offset in a reading process) due to luminosity variations of the laser light spot and unbalance of a so-called PDIC gain. According to the related art, performing online closed loop control would probably be helpful on controlling the recording track offset, where an all sum (AS) signal corresponding to a radio frequency (RF) signal can be utilized for controlling the laser light spot 24 to scan along line (b), as shown in FIG. 2.

During an optimal power calibration (OPC) process that is typically performed before a recording process, if an initial value of the recording track offset (e.g., a zero initial value) is inappropriate, which means the initial value of the recording track offset is far from a real value corresponding to a real radial location of the optical head with respect to a track, an OPC fail would probably occur. Even if no OPC fail occurs, a calibrated value of the recording power of the optical head is usually higher than a typical value of the recording power, which leads to problems such as a decreasing number of overall rewritable times of the DVD-RAM disc, a higher error rate, and a greater jitter value.

Regarding a recording process without performing the OPC process in advance, if an initial value of the recording track offset is unsuitable, first recorded data (e.g. the data previously recorded on the first track mentioned above) will be partially/fully erased or overwritten by later recorded data (e.g. the data recorded on the second track mentioned above). As a result, at least a portion of the first recorded data on the DVD-RAM disc is lost.

SUMMARY

It is an objective of the claimed invention to provide systems and methods for calibrating a recording track offset of an optical storage device accessing an optical storage medium of a land and groove recording/reproduction type.

An exemplary embodiment of a system for calibrating a recording track offset of an optical storage device accessing an optical storage medium of land/groove type comprises: a tracking servo loop arranged to control tracking operations of an optical head of the optical storage device; a track offset control loop arranged to control the recording track offset for the tracking servo loop; a controller arranged to save a latest value of the recording track offset as a readout value for further utilization in a recording process performed later while the track offset control loop derives the latest value; and a comparator arranged to compare a recording length with a threshold value, and generate a flag to represent whether the recording length is a long recording length.

An exemplary embodiment of a method for calibrating a recording track offset of an optical storage device accessing an optical storage medium of land/groove type comprises: saving a latest value of the recording track offset as a readout value for further utilization in a recording process performed later while a track offset control loop of the optical storage device derives the latest value; and comparing a recording length with a threshold value and determining whether to update an initial value accordingly.

An exemplary embodiment of a system for calibrating a recording track offset of an optical storage device accessing an optical storage medium of land/groove type comprises: a tracking servo loop arranged to control tracking operations of an optical head of the optical storage device; a track offset control loop arranged to control the recording track offset for the tracking servo loop, the track offset control loop comprising a compensating unit arranged to control the recording track offset by performing a statistical calculation according to a plurality of differences calculated within the track offset control loop; and a controller arranged to save a latest value of the recording track offset as a readout value for further utilization in a recording process performed later while the track offset control loop derives the latest value.

An exemplary embodiment of a method for calibrating a recording track offset of an optical storage device accessing an optical storage medium of land/groove type comprises: saving a latest value of the recording track offset as a readout value for further utilization in a recording process performed later while a track offset control loop of the optical storage device derives the latest value; and controlling the recording track offset by performing a statistical calculation according to a plurality of differences calculated within the track offset control loop.

These and other objectives of the present invention will no doubt become obvious to those of ordinary skill in the art after

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 3:
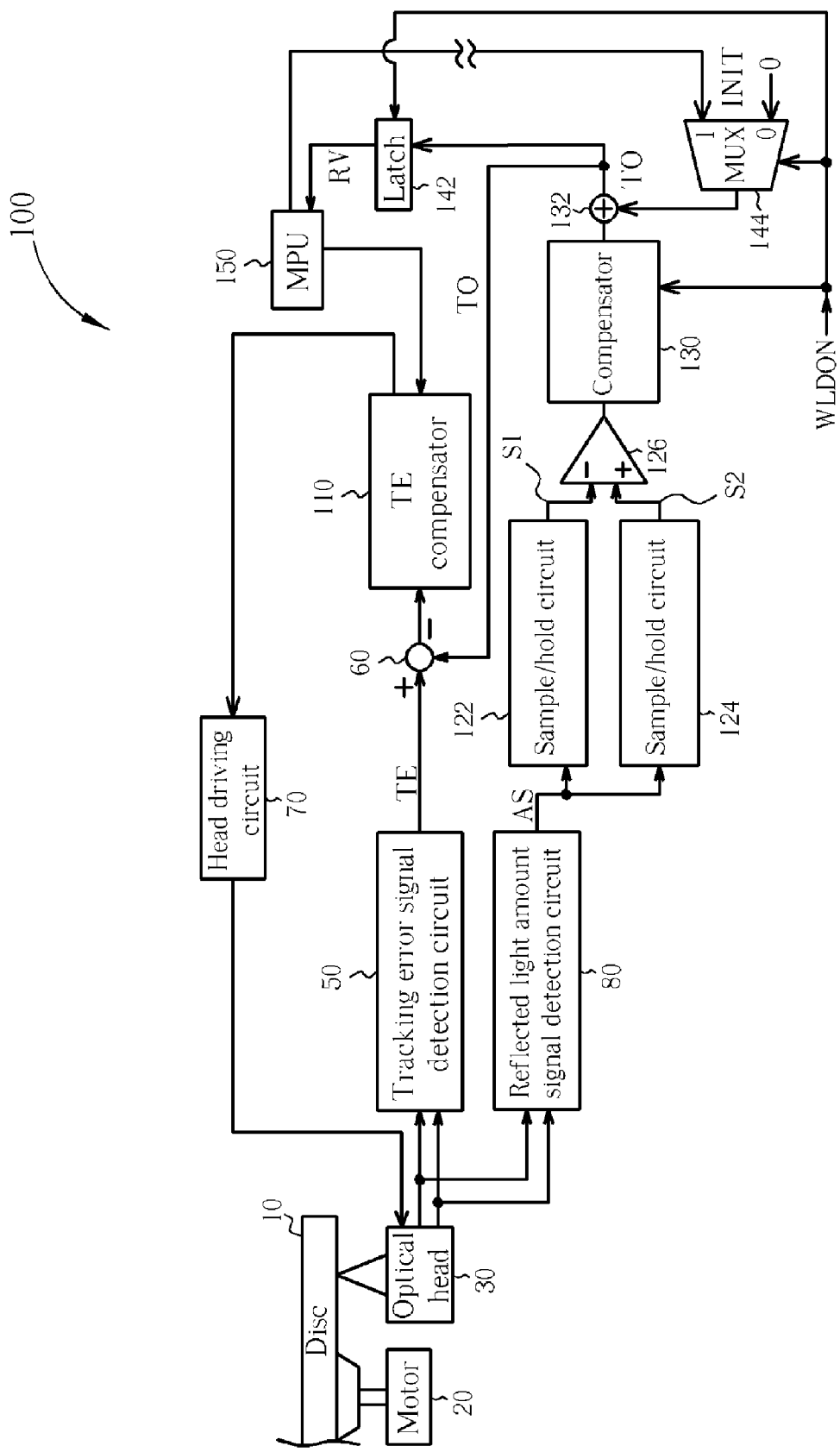
FIG. 3 is a diagram of an optical storage device according to an embodiment of the present invention.

Please refer to FIG. 3. FIG. 3 illustrates an optical storage device 100 such as a digital versatile disc (DVD) drive according to an embodiment of the present invention, where the optical storage device 100 is capable of accessing an optical storage medium 10 of a land and groove recording/reproduction type, for example, an optical disc such as a DVD-RAM. As shown in FIG. 3, a tracking control system of the optical storage device 100 comprises a tracking servo loop comprising a tracking error signal detection circuit 50, a tracking error (TE) compensator 110, and a head driving circuit 70, where the tracking servo loop is utilized for controlling tracking operations of an optical head 30 of the optical storage device 100 along the radial direction with respect to a spindle motor 20 of the optical storage device 100.

The tracking error signal detection circuit 50 is capable of generating a tracking error signal TE according to a reproduced signal comprising at least one of two outputs from the optical head 30. The TE compensator 110 is utilized for performing compensation, in order to control the radial location of the optical head 30 according to the tracking error signal TE by utilizing the head driving circuit 70, where the head driving circuit 70 drives the optical head 30 according to an output of the TE compensator 110.

As shown in FIG. 3, the tracking control system further comprises a track offset control loop comprising a reflected light amount signal detection circuit 80, a sample/hold circuit 122, a sample/hold circuit 124, a differential circuit 126, and a compensator 130, where the track offset control loop mentioned above is typically enabled while the optical storage device 100 is recording data onto the optical storage medium 10.

Figure 1:
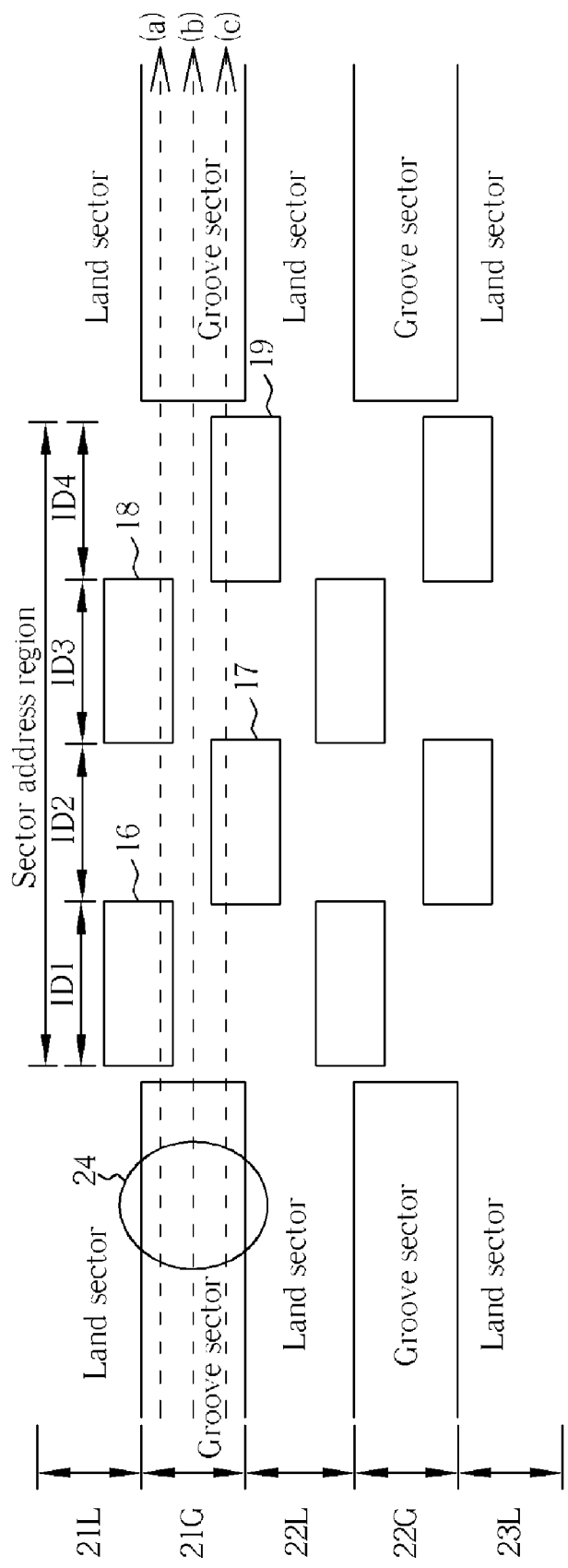
FIG. 1 illustrates groove tracks and land tracks on a DVD-RAM disc according to the related art.
Figure 2:
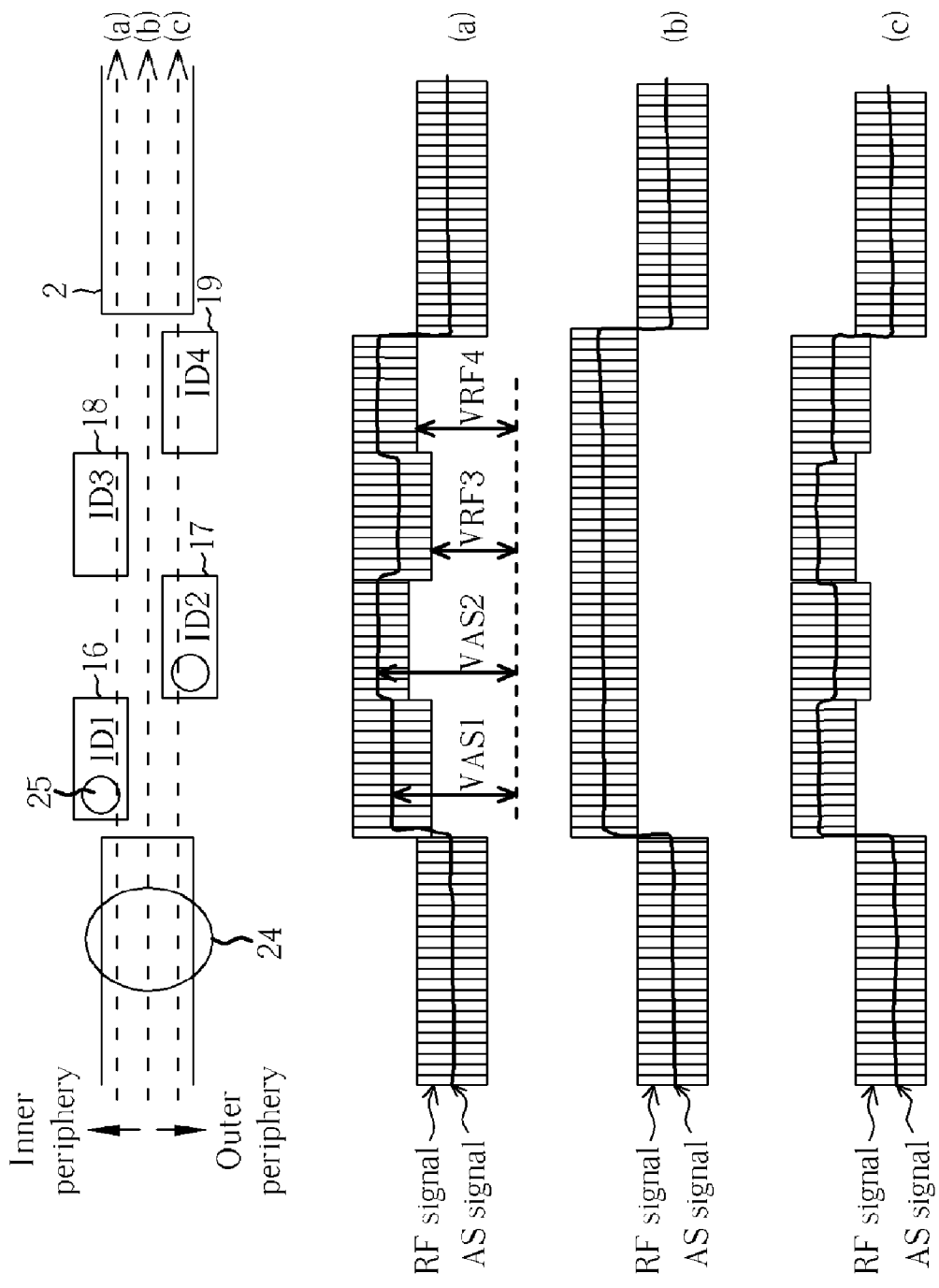
FIG. 2 illustrates an all sum (AS) signal utilized for controlling the recording track offset according to the related art.

The reflected light amount signal detection circuit 80 comprises an addition circuit (not shown) for summing the two outputs from the optical head 30 to generate an added signal, and a low-pass filter (not shown) for filtering the added signal to generate a reflected light amount signal AS, which is also referred to as the all-sum (AS) signal in this embodiment. The sample/hold circuit 122 and the sample/hold circuit 124 sample/hold the reflected light amount signal AS to generate outputs S1 and S2, respectively. In addition, the differential circuit 126 calculates a difference between the outputs S1 and S2. According to a first implementation choice of this embodiment, the outputs S1 and S2 respectively correspond to detection values VAS1 and VAS2 shown in FIG. 2. According to a second implementation choice of this embodiment, the outputs S1 and S2 respectively correspond to detection values VRF3 and VRF4 shown in FIG. 2.

By applying either of the implementation choices mentioned above, the difference outputted from the differential circuit 126 can be utilized as an indication of whether the laser light spot emitted from the optical head 30 is centered at line (b) or whether the laser light spot is shifted toward line (a) or line (c). That is, the difference outputted from the differential circuit 126 can be utilized as an indication of the radial location of the optical head 30. As a result, by utilizing the differential circuit 126 and the compensator 130, the track offset control loop adjusts the tracking error signal TE according to the outputs S1 and S2 respectively from the sample/hold circuit 122 and the sample/hold circuit 124, where an arithmetic unit 132 coupled to the compensator 130 can be utilized for injecting an initial signal into the track offset control loop.

Figure 4:
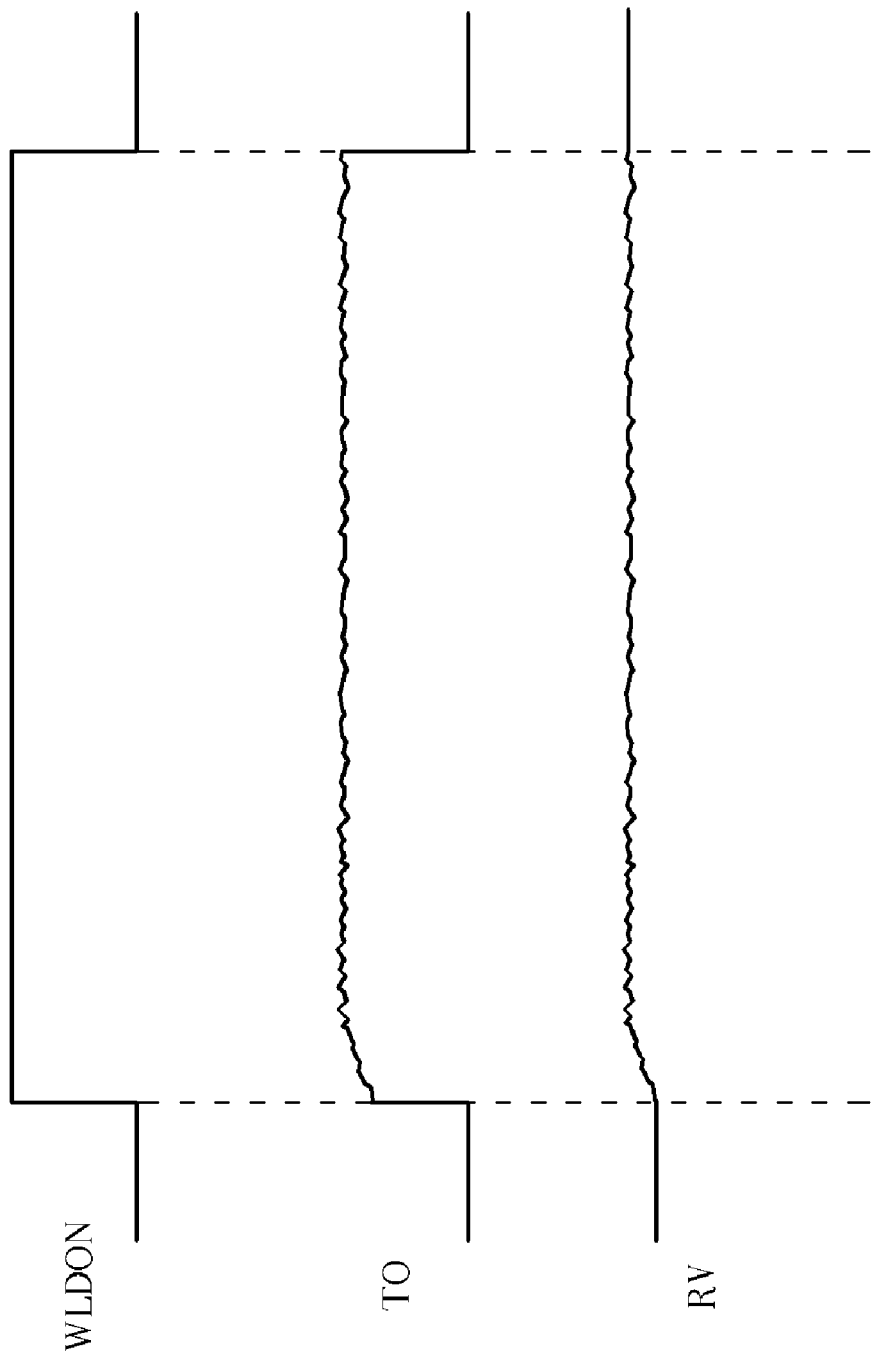
FIG. 4 illustrates waveforms of related signals of the optical storage device according to an embodiment of the present invention.

If a control signal WLDON is corresponding to a logical value "0" representing a reading process, a multiplexer 144 coupled to the arithmetic unit 132 selects a zero input, causing the initial signal injected into the track offset control loop through the arithmetic unit 132 to be substantially zero, where the logical value "0" mentioned above corresponds to a low level in this embodiment, as shown in FIG. 4. Conversely, if the control signal WLDON is corresponding to a logical value "1" representing a recording process, the multiplexer 144 selects an initial value INIT, causing the initial signal injected into the track offset control loop through the arithmetic unit 132 to carry the initial value INIT, where the logical value "1" mentioned above corresponds to a high level in this embodiment, as shown in FIG. 4.

According to this embodiment, in order to perform a recording process, a controller such as a micro-processing unit (MPU) 150 of the optical storage device 100 can be utilized for setting the initial value INIT mentioned above, where the initial value INIT represents an initial track offset. Thus, the track offset control loop may utilize the initial track offset as an initial state (or a beginning point) for performing forward control. As long as the initial value is around a steady state value of the track offset control loop, the recording process can be started from the middle of a track.

It is noted that the initial value INIT can be first derived during a recording track offset calibration process, so the initial value INIT can be utilized for setting the initial state before the recording process or in the beginning of the recording process. As a result, recording user data can be started from the middle of a track.

According to this embodiment, the MPU 150 sets the initial value INIT before the recording process. At the moment when recording is started, the control signal WLDON rises to the high level, and a track offset signal TO outputted from the arithmetic unit 132 is equivalent to the initial signal carrying the initial value INIT. The track offset control loop starts operation with the initial value INIT representing the initial track offset. In order to achieve this, internal state(s) of the compensator 130 and the output thereof are cleared and reset to zero at a time point of a rising edge of the control signal WLDON such as that shown in FIG. 4 since compensators typically have memory effects, which means previous state(s) and output(s) may remain.

As shown in FIG. 3, a latch 142 is utilized for latching the value of the track offset signal TO at a time point of a falling edge of the control signal WLDON such as that shown in FIG. 4. Taking the situation shown in FIG. 4 as an example, when the control signal WLDON falls to the low level, a readout value signal RV outputted from the latch 142 represents a latched value, where the MPU 150 saves the latched value as a readout value for further utilization. For example, in another recording process performed later, the readout value represents the previous control result of the track offset control loop in the previous recording process, and can be utilized as the initial value INIT set by the MPU 150 before the recording process performed later or in the beginning of the recording process performed later. As a result, similar situations may occur as shown in FIG. 4.

In each of these situations such as that shown in FIG. 4, from the time point when the control signal WLDON rises to the high level till the time point when the control signal WLDON falls to the low level, the readout value signal RV has the same waveform as the track offset signal TO, where the track offset signal TO has the same initial value INIT carried by the initial signal at the time point when the control signal WLDON rises to the high level. In addition, at the time point when the control signal WLDON falls to the low level, the latch 142 latches the track offset signal TO and outputs a latched value, so the MPU 150 saves the latched value as a readout value for further utilization. The track offset signal TO is reset to zero at the time point when the control signal WLDON falls to the low level since the multiplexer 144 coupled to the arithmetic unit 132 selects the zero input according to the control signal WLDON.

It is noted that in general, the track offset signal TO injected into the tracking servo loop through the arithmetic unit 60 carries a track offset. According to a variation of this embodiment, a controller such as the MPU 150 mentioned above is capable of deriving the track offset according to a readout value corresponding to the track offset signal TO (e.g. the latched value of the readout value signal RV), and saving (i.e., storing) the track offset represented by the readout value into a storage unit (not shown) such as a register (or memory) within the optical storage device 100. According to this variation, the register (or memory) for saving the track offset is positioned in the MPU 150. In a recording process, the track offset is referred to as a recording track offset, where the compensator 130 mentioned above is capable of controlling the recording track offset according to the difference calculated by the differential circuit 126. As a result, with the above-mentioned operations of the components of the track offset control loop, the track offset control loop can be utilized for controlling the recording track offset. On the other hand, in a reading process, the track offset is referred to as a reading track offset or a reproduction track offset. Within the tracking control system shown in FIG. 3, either the recording track offset or the reading track offset can be set to have an initial value carried by the initial signal injected through the arithmetic unit 132. According to this variation, the initial value INIT carried by the initial signal is set by the MPU 150. In general, a typical value of the recording track offset is not certainly the same as or close to that of the reading track offset. In some occasions, the typical value of the recording track offset is far from that of the reading track offset.

Figure 5:
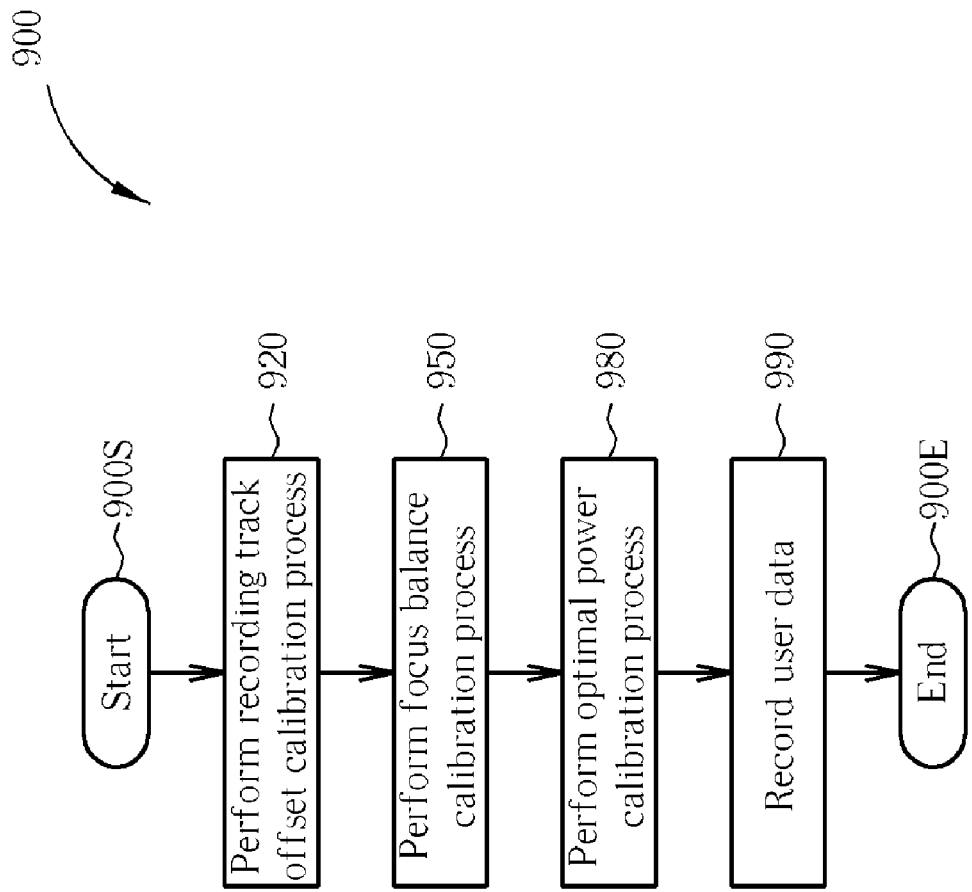
FIG. 5 is a flowchart illustrating calibration steps that an optical storage device performs before recording user data onto an optical storage medium of a land and groove recording/reproduction type according to an embodiment of the present invention.
Figure 6:
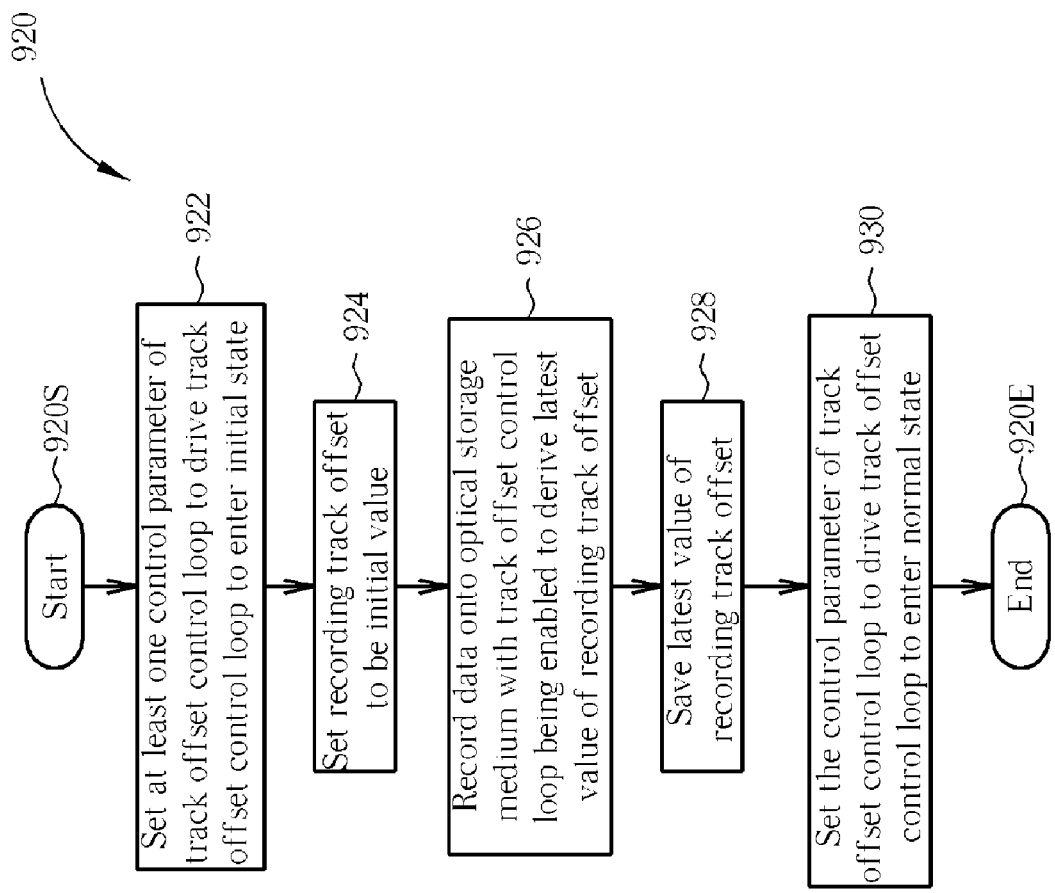
FIG. 6 is a flowchart of a method for calibrating a recording track offset of an optical storage device accessing an optical storage medium of a land and groove recording/reproduction type according to an embodiment of the present invention.

Please refer to FIG. 5 and FIG. 6. FIG. 5 is a flowchart illustrating calibration steps that an optical storage device performs before recording user data onto an optical storage medium of a land and groove recording/reproduction type according to an embodiment of the present invention. FIG. 6 is a flowchart of a method for calibrating a recording track offset of an optical storage device accessing an optical storage medium of a land and groove recording/reproduction type according to an embodiment of the present invention. Both the working flows of the flowcharts shown in FIG. 5 and FIG. 6 can be applied to the optical storage device 100 shown in FIG. 3, where FIG. 6 substantially illustrates detailed steps of Step 920 shown in FIG. 5 according to this embodiment. Additionally, control of steps shown in FIG. 5 and FIG. 6 can be implemented by utilizing a controller such as the MPU 150 executing a firmware code.

According to the flowchart shown in FIG. 5, the optical storage device 100 performs a recording track offset calibration process (Step 920), a focus balance calibration process (Step 950), and a optimal power calibration (OPC) process (Step 980) before recording user data onto the optical storage medium 10 (Step 990), where the OPC process is well known in the art. According to the flowchart shown in FIG. 6, the method can be described as follows:

Step 922: Set at least one control parameter of the compensator 130 of the track offset control loop to drive the track offset control loop to enter a calibration state.

Step 924: Set the recording track offset to be an initial value INIT carried by the initial signal, where the initial value INIT is substantially zero or the typical value of the reading track offset.

Step 926: Record data (e.g., a predetermined test pattern or a portion of the user data) onto the optical storage medium 10 with the track offset control loop being enabled to derive the latest value of the recording track offset. More particularly, in this embodiment, the MPU 150 controls the optical storage device 100 to record data onto a test zone of the optical storage medium 10 with the track offset control loop being enabled to derive the latest value of the recording track offset. According to this embodiment, the MPU 150 derives the latest value of the recording track offset from the readout value corresponding to the track offset signal TO (e.g. the latched value of the readout value signal RV) as mentioned above. In a situation such as that shown in FIG. 4, the latch 142 latches the track offset signal TO and outputs the latched value at the time point when the control signal WLDON falls to the low level in the end of the recording process.

Step 928: Save the latest value of the recording track offset (e.g. the readout value mentioned above) into the storage unit such as the register (or memory) within the optical storage device 100 as mentioned above. The latest value stored in the storage unit can be utilized as a predetermined value to be carried by the initial signal (e.g. the initial value INIT carried by the initial signal) while executing later steps such as Steps 950, 980, or 990. As mentioned above, the MPU 150 may save the latched value as the readout value for further utilization, so once the readout value is stored in the storage unit, it can be considered to be the latest value of the recording track offset for the recording process performed later. Similar descriptions related to further utilization of the calibration result, for example, utilizing the MPU 150 to set the initial value INIT, controlling the control signal WLDON to rise to the high level and controlling the track offset signal TO to be equivalent to the initial signal carrying the initial value INIT at the moment when recording is started, are not repeated in detail here.

Step 930: Set the control parameter of the compensator 130 of the track offset control loop to drive the track offset control loop to enter a normal state, where a loop response of the track offset control loop in the calibration state is different from that in the normal state. More specifically, the loop response of the calibration state is faster than that of the normal state according to this embodiment.

The compensator 130 of this embodiment is implemented by utilizing a filter having a plurality of control parameters, where a loop bandwidth of the track offset control loop can be controlled by properly setting the control parameters. In addition, a loop gain of the track offset control loop can be adjusted by changing the control parameters. As a result, the compensator 130 performs compensation according to the control parameters.

According to this embodiment, the MPU 150 sets the control parameters to drive the track offset control loop to enter the calibration state in Step 922, and sets the control parameters to drive the track offset control loop to enter the normal state in Step 930, so that the loop bandwidth of the calibration state is higher than that of the normal state. According to a trial experiment with the optical storage device 100 being a DVD drive accessing a DVD-RAM, a typical value of the ratio of the loop bandwidth of the calibration state to the loop bandwidth of the normal state ranges from four to five.

It is noted that the outputs S1 and S2 are indications for determining the recording track offset since the difference between the outputs S1 and S2 represents a radial location shift amount of the optical head 30 with respect to a track. According to this embodiment, if the outputs S1 and S2 are not equal to each other in the calibration state, the recording track offset can be rapidly tuned to the latest value in Step 926, so the radial location of the optical head 30 can be rapidly aligned to the center of the track. In addition, in order to prevent from being prone to errors while performing certain steps that are sensitive to noises (e.g., recording the user data), the slower loop response of the normal state can be utilized after executing Step 930.

According to a variation of this embodiment, the MPU 150 simply sets the control parameters to have different values respectively in Step 922 and 930, so the control parameters set the track offset control loop to have a first loop gain in the calibration state and sets the track offset control loop to have a second loop gain in the normal state, where the first loop gain is greater than the second loop gain. According to a trial experiment with the optical storage device 100 being a DVD drive accessing a DVD-RAM, a typical value of the ratio of the first loop gain to the second loop gain is approximately two.

According to a variation of this embodiment, Step 990 can be executed N times, where Step 990 shown in FIG. 5 can be replaced with Steps 990-0, 990-1, . . . , and 990-(N−1). In addition, Step 920 shown in FIG. 5 can be further executed at least one time between two of Steps 990-0, 990-1, . . . , and 990-(N−1). For example, Step 920 shown in FIG. 5 can be further executed (N−1) times as Steps 920-1, 920-2, . . . , and 920-(N−1) respectively next to Steps 990-0, 990-1, . . . , and 990-(N−2), where the data recorded in Step 926-$i$ corresponding to Step 920-$i$ ($i=1, 2, \ldots, (N-1)$) is not necessary to be recorded onto the test zone mentioned above.

Figure 7:
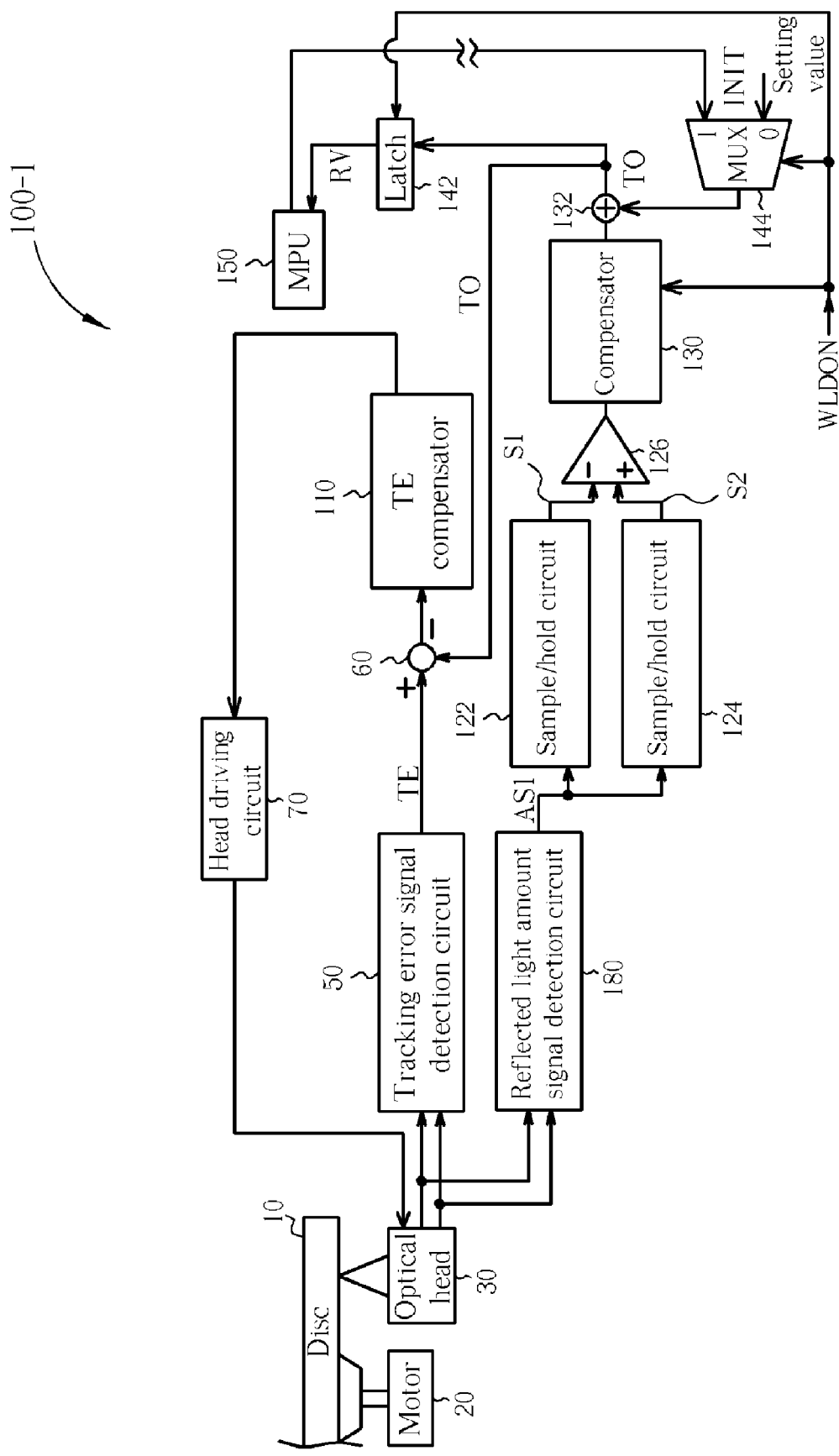
FIG. 7 is a diagram of an optical storage device according to a first embodiment of the present invention, where the first embodiment is a variation of the embodiment shown in FIG. 3.

Please refer to FIG. 7. FIG. 7 is a diagram of an optical storage device 100-1 according to a first embodiment of the present invention, where the first embodiment is a variation of the embodiment shown in FIG. 3. Differences between the first embodiment and the embodiment shown in FIG. 3 can be described as follows. In the first embodiment, a setting value set arbitrarily is utilized for replacing the zero input of the multiplexer 144 of the embodiment shown in FIG. 3. Thus, when the control signal WLDON falls to the low level, the multiplexer 144 selects the setting value. In addition, the control function implemented by a signal connection from the MPU 150 to the TE compensator 110 as shown in FIG. 3 is not required in the first embodiment. Namely the MPU 150 here may execute other functions according to the firmware.

As shown in FIG. 7, another reflected light amount signal detection circuit 180 is utilized for replacing the reflected light amount signal detection circuit 80 mentioned above to generate another reflected light amount signal AS1. The sample/hold circuits 122 and 124 of this embodiment may sample/hold the reflected light amount signal AS1 according to specific time points to generate the outputs S1 and S2, respectively.

Figure 8:
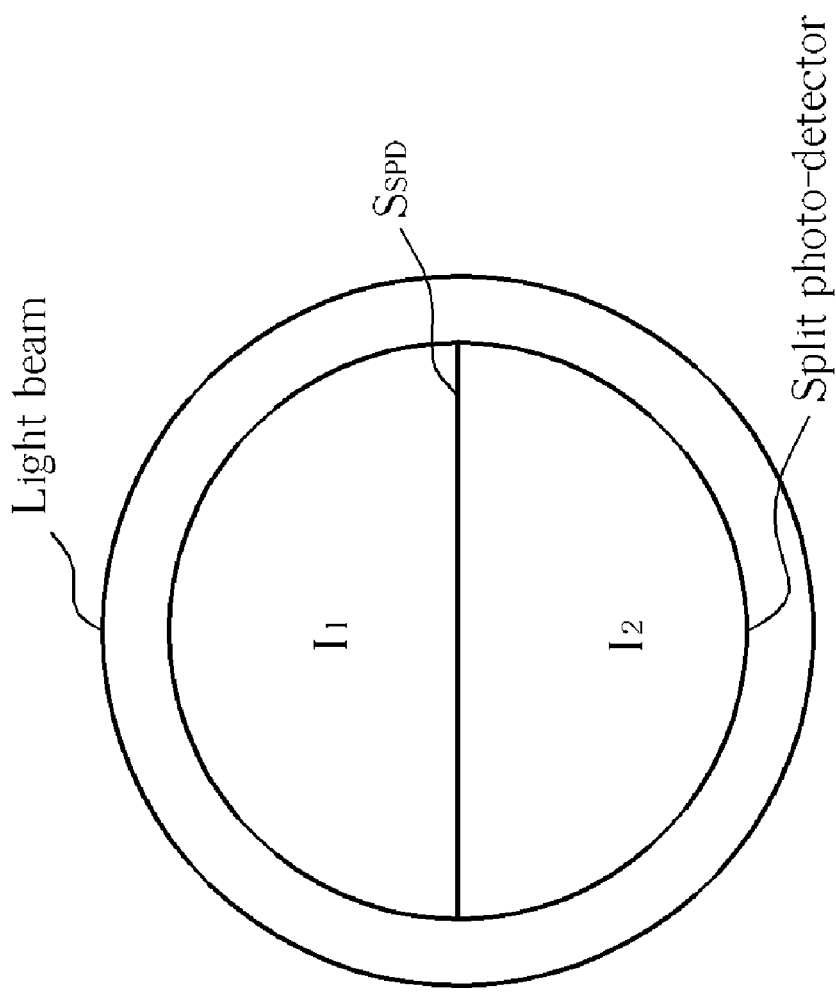
FIG. 8 illustrates a split photo-detector utilized in the optical storage device shown in FIG. 7 according to an embodiment of the present invention.

FIG. 8 illustrates a split photo-detector utilized in the optical storage device 100-1 shown in FIG. 7 according to an embodiment of the present invention, where the split photo-detector has a first detection region $I_1$ and a second detection region $I_2$. Typically, the separator $S_{SPD}$ between the two detection regions is parallel to the projected track axis, and the reflected light amount signal AS1 substantially represents the sum of the detection results from the first detection region $I_1$ and the second detection region $I_2$, respectively.

It is noted that the specific time points mentioned above are determined according to header types complying with specific DVD-RAM specifications, and the outputs S1 and S2 of FIG. 7 can be used to represent the track offset shift amount from a central line. The central line, such as line (a0) shown in FIG. 9, is a path (or trace) of the laser light spot emitted from the optical head 30 onto the disc 10 when the disc 10 rotates.

Figure 9:
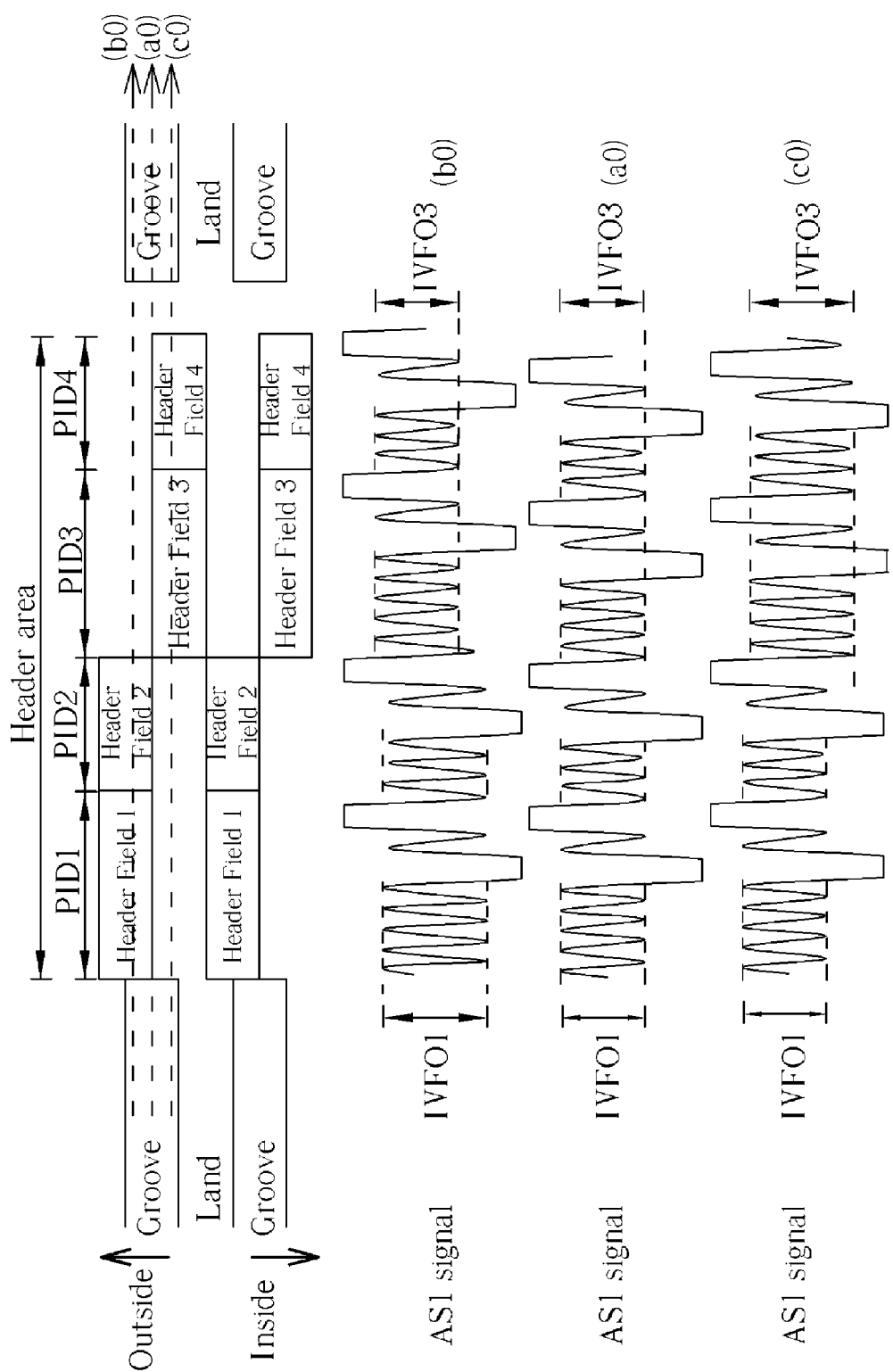
FIG. 9 illustrates peak-to-peak values of another reflected light amount signal utilized in the optical storage device shown in FIG. 7 regarding a situation.

FIG. 9 illustrates peak-to-peak values (signal amplitudes) of the reflected light amount signal AS1 utilized in the optical storage device 100-1 shown in FIG. 7 regarding a situation. In this situation, the signal amplitude of the path corresponding to the first detection region $I_1$ of the split photo-detector shown in FIG. 8 is equal to the signal amplitude of the path corresponding to the second detection region $I_2$ of the split photo-detector shown in FIG. 8. The peak-to-peak values IVFO1, IVFO2, IVFO3 and IVFO4 are used to respectively represent the header's deviating situations on different sides of the central line (a0) in the header fields 1 to 4.

Due to the specifications mentioned above, the header fields 1 to 4 of the header area shown in FIG. 9 are arranged to be located around the edges between the grove and land areas, and header fields 1 to 4 respectively have the address related data PID1 to PID4 with PID representing Physical Identification Data. Moreover, the header area is designed to have a pattern comprising repeated sets of 4T-pits and 4T-lands (i.e. the so-called VFO area, with VFO representing Variable Frequency Oscillator), and the optical storage device 100-1 can be controlled according to whether the peak-to-peak values are equal to each other or not. In this embodiment, as the header fields 1 and 3 are bigger than header fields 2 and 4, it will be easier to utilize their corresponding peak-to-peak values IVFO1 and IVFO3 for implementation of controlling the optical storage device 100-1. According to the peak-to-peak values IVFO1 and IVFO3, the recording track offset can be adjusted. As long as the peak-to-peak values IVFO1 and IVFO3 are equal to each other, the goal of centering the laser light spot emitted from the optical head 30 at line (a0) is reached.

When the laser light spot is centered at the central line (a0), the peak-to-peak values respectively corresponding to the detection region $I_1$ (i.e. the $I_1$ path) and the detection region $I_2$ (i.e. the $I_2$ path) are equal to each other. When the laser light spot is shifted toward line (b0), the peak-to-peak value IVFO1 becomes greater than the peak-to-peak value IVFO3. When the laser light spot is shifted toward line (c0), the peak-to-peak value IVFO1 becomes less than the peak-to-peak value IVFO3.

It is noted that the amplitude outlines of the AS1 signal shown in FIG. 9 are described corresponding to an idealized case. In this idealized case, there is no difference between the $I_1$ path and the $I_2$ path, and the split photo-detector is perfectly aligned. On the contrary, in a real case, such as that shown in FIG. 10 or FIG. 11, unbalance between the $I_1$ path and the $I_2$ path may occur, and/or the split photo-detector may be improperly aligned.

Figure 10:
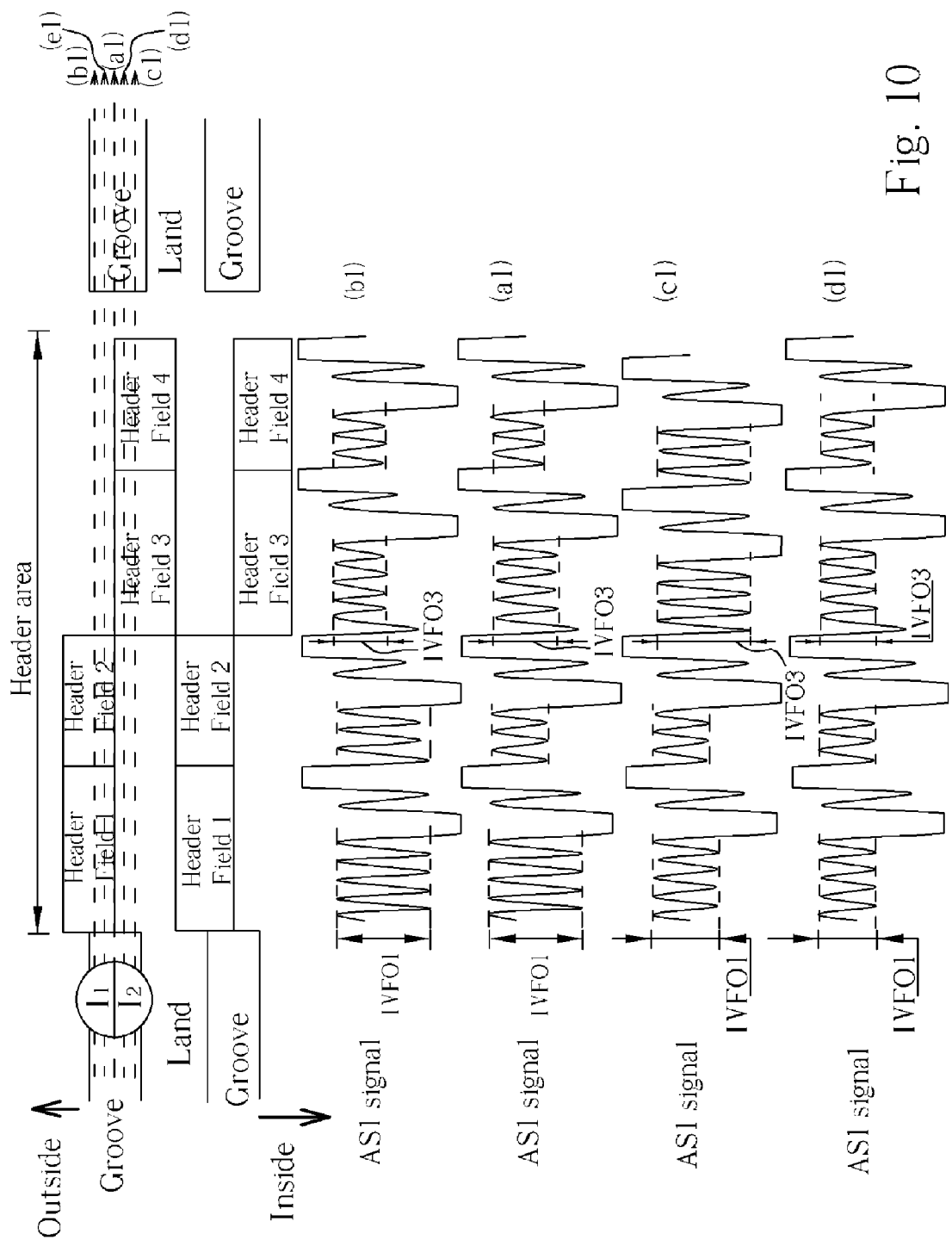
FIG. 10 and FIG. 11 illustrate peak-to-peak values of the reflected light amount signal utilized in the optical storage device shown in FIG. 7 regarding other situations.
Figure 11:
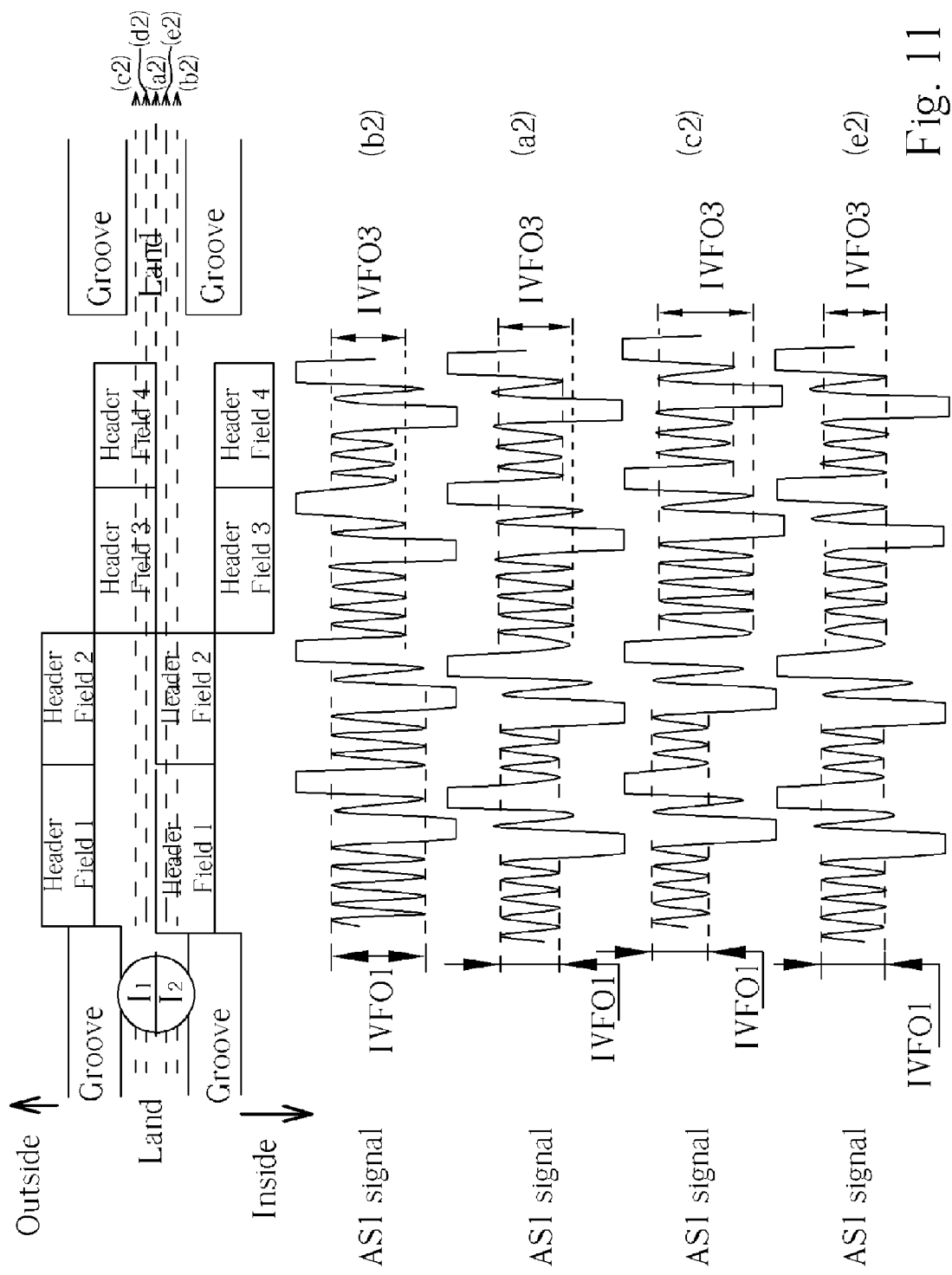

FIG. 10 and FIG. 11 illustrate the peak-to-peak values IVFO1 and IVFO3 of the reflected light amount signal AS1 utilized in the optical storage device 100-1 shown in FIG. 7 of other situations. In these situations, the signal amplitudes respectively corresponding to the detection regions $I_1$ and $I_2$ are different. For example, the signal amplitude of the path corresponding to the detection region $I_1$ (i.e. the $I_1$ path) is greater than the signal amplitude of the path corresponding to the detection region $I_2$ (i.e. the $I_2$ path) when the laser light spot emitted from the optical head 30 is centered at line (a1) and line (a2), respectively. Please note that the first detection region $I_1$ and the second detection region $I_2$ mentioned above are parabolically illustrated in FIG. 10 and FIG. 11 for better understanding of the corresponding light amounts detected by respective detection regions.

More specifically, as the path gain of the $I_1$ path is greater than the path gain of the $I_2$ path, the behaviors corresponding to groove tracks and land tracks are different, as shown in FIG. 10 and FIG. 11 respectively. Please refer to FIG. 10 first. As the path gain of the $I_1$ path is greater than the path gain of the $I_2$ path, and as the header fields 1 and 3 respectively correspond to the $I_1$ path and the $I_2$ path, when the laser light spot is centered at line (a1), the peak-to-peak value IVFO1 is greater than the peak-to-peak value IVFO3. When the laser light spot deviates from line (a1) toward line (b1) thereafter, since the peak-to-peak value IVFO1 is originally greater than the peak-to-peak value IVFO3, the difference between the peak-to-peak values IVFO1 and IVFO3 becomes greater.

On the other hand, when the laser light spot deviates from line (a1) toward line (c1) thereafter, since the peak-to-peak value IVFO1 is originally less than the peak-to-peak value IVFO3, the difference between the peak-to-peak values IVFO1 and IVFO3 becomes smaller. Thus, when the laser light spot is centered at line (d1), meaning the laser light spot deviate from line (a1) a little bit toward line (c1), the peak-to-peak value IVFO1 and the peak-to-peak value IVFO3 approach substantially the same value. As for the deviation amount from line (a1) to line (d1), it depends on the difference between the path gain of the $I_1$ path and the path gain of the $I_2$ path. When the difference is greater, the deviation amount from line (a1) to line (d1) is larger (i.e. line (d1) is closer to line (c1)); otherwise, the deviation amount is smaller (i.e. line (d1) is closer to line (a1)).

Similarly, when the path gain of the $I_1$ path is less than the path gain of the $I_2$ path regarding the same groove track shown in FIG. 10, the laser light spot deviates from line (a1) toward line (e1) thereafter.

Regarding the situation shown in FIG. 11, the laser light spot has moved from the groove track to the adjacent land track. As the path gain of the $I_1$ path is greater than the path gain of the $I_2$ path, and as the header fields 1 and 3 respectively correspond to the $I_2$ path and the $I_1$ path, when the laser light spot is centered at line (a2), the peak-to-peak value IVFO1 is less than the peak-to-peak value IVFO3. When the laser light spot deviates from line (a2) toward line (c2) thereafter, since the peak-to-peak value IVFO1 is originally less than the peak-to-peak value IVFO3, the difference between the peak-to-peak values IVFO1 and IVFO3 becomes greater.

On the other hand, when the laser light spot deviates from line (a2) toward line (b2) thereafter, since the peak-to-peak value IVFO1 is originally less than the peak-to-peak value IVFO3, the difference between the peak-to-peak values IVFO1 and IVFO3 becomes smaller. Thus, when the laser light spot is centered at line (e2), i.e. the laser light spot deviate from line (a2) a little bit toward line (b2), the peak-to-peak value IVFO1 and the peak-to-peak value IVFO3 approach substantially the same value. As for the deviation amount from line (a2) to line (e2), it depends on the difference between the path gain of the $I_1$ path and the path gain of the $I_2$ path. When the difference is greater, the deviation amount from line (a2) to line (e2) is larger (i.e. line (e2) is closer to line (b2); otherwise, the deviation amount is smaller (i.e. line (e2) is closer to line (a2)).

Similarly, when the path gain of the $I_1$ path is less than the path gain of the $I_2$ path regarding the same land track shown in FIG. 11, the laser light spot deviates from line (a2) toward line (d2) thereafter.

Regarding the transition from the situation shown in FIG. 10 to the situation shown in FIG. 11, when the laser light spot originally centered at line (d1) (i.e. the target of the laser light spot along the groove track) moves to the land track, the laser light spot is initially centered at line (d2). However, the target of the laser light spot along the land track is line (e2). As a result, when the recording track offset control is enabled, the laser light spot will move from line (d2) to line (e2).

Regarding the transition from the situation shown in FIG. 11 to the situation shown in FIG. 10, when the laser light spot originally centered at line (e2) (i.e. the target of the laser light spot along the land track) moves to the groove track, the laser light spot is initially centered at line (e1). However, the target of the laser light spot along the groove track is line (d1). As a result, when the recording track offset control is enabled, the laser light spot will move from line (e1) to line (d1).

Generally speaking, the laser light spot swings between lines (d') and (e'), where line (d') represents line (d1) or line (d2), and line (e') represents line (e1) or line (e2). The bandwidth of the compensator 130 can be further reduced to alleviate or eliminate the swinging effect between lines (d') and (e'), and therefore the laser light spot is substantially centered at line (a') regardless of whether the path gain of the $I_1$ path is equal to the path gain of the $I_2$ path, wherein line (a') represents the real track center of a track in general, e.g. lines (a0), (a1) and (a2).

According to the first embodiment, comparing to the idealized case mentioned above, the optical storage device 100-1 of FIG. 7 may also work properly in the real case by setting the bandwidth of the compensator 130, so the optical head 30 will not obviously swing between line (d') and line (e'). For example, an upper limit of the bandwidth of the compensator 130 can be set to be lower than a specific percentage of the rotational frequency (e.g. a percentage from 10% to 20%). The lower bandwidth of the compensator 130, the more accurately the laser light spot emitted from the optical head 30 is centered at line (a').

Under general conditions, when the recording length is long enough during recording, the architecture mentioned in FIG. 3 can overcome the problem of the swinging effect. When the recording length is often short during recording, the probability of recording on groove tracks and the probability of recording on land tracks may be unequal, probably causing malfunction or low performance of the architecture mentioned in FIG. 3.

For example, when the recording length is equal to one Error Correction Code (ECC) block (e.g. sixteen sectors in this embodiment) during recording, and more particularly the recording locations are discontinuously distributed and are further scattered all over the disc from inner to outer peripheries, the probability of recording on groove tracks is not equal to the probability of recording on land tracks. Therefore, some of the embodiments of this invention can be used for these conditions with unequal probability of recording on the groove and land tracks.

In worse conditions, the probability of recording on groove tracks greatly differs from the probability of recording on land tracks. When most data are recorded on groove tracks, the center of the laser light spot will fall on line (d'). As the path gain of the $I_1$ path is greater than the path gain of the $I_2$ path in this embodiment, once the difference between the two path gains is greater, the deviation amount from line (a') to line (d') will be much closer to line (c') with line (c') representing line (c1) or line (c2)). Even the center of the laser light spot will fall on line (c') to probably damage the data on the adjacent track.

On the contrary, when most data are recorded on land tracks, the center of the laser light spot will fall on line (e'). As the path gain of the $I_1$ path is greater than the path gain of the $I_2$ path in this embodiment, once the difference between the two path gains is greater, the deviation amount from line (a') to line (e') is larger (i.e. line (e') will be much closer to line (b') with line (b') representing line (b1) or line (b2)). Even the center of the laser light spot will fall on line (b') to probably damage the data on the adjacent track. In order to solve these problems, more embodiments of the present invention (e.g. those corresponding to FIG. 12 to FIG. 18) are further described as follows.

Figure 12:
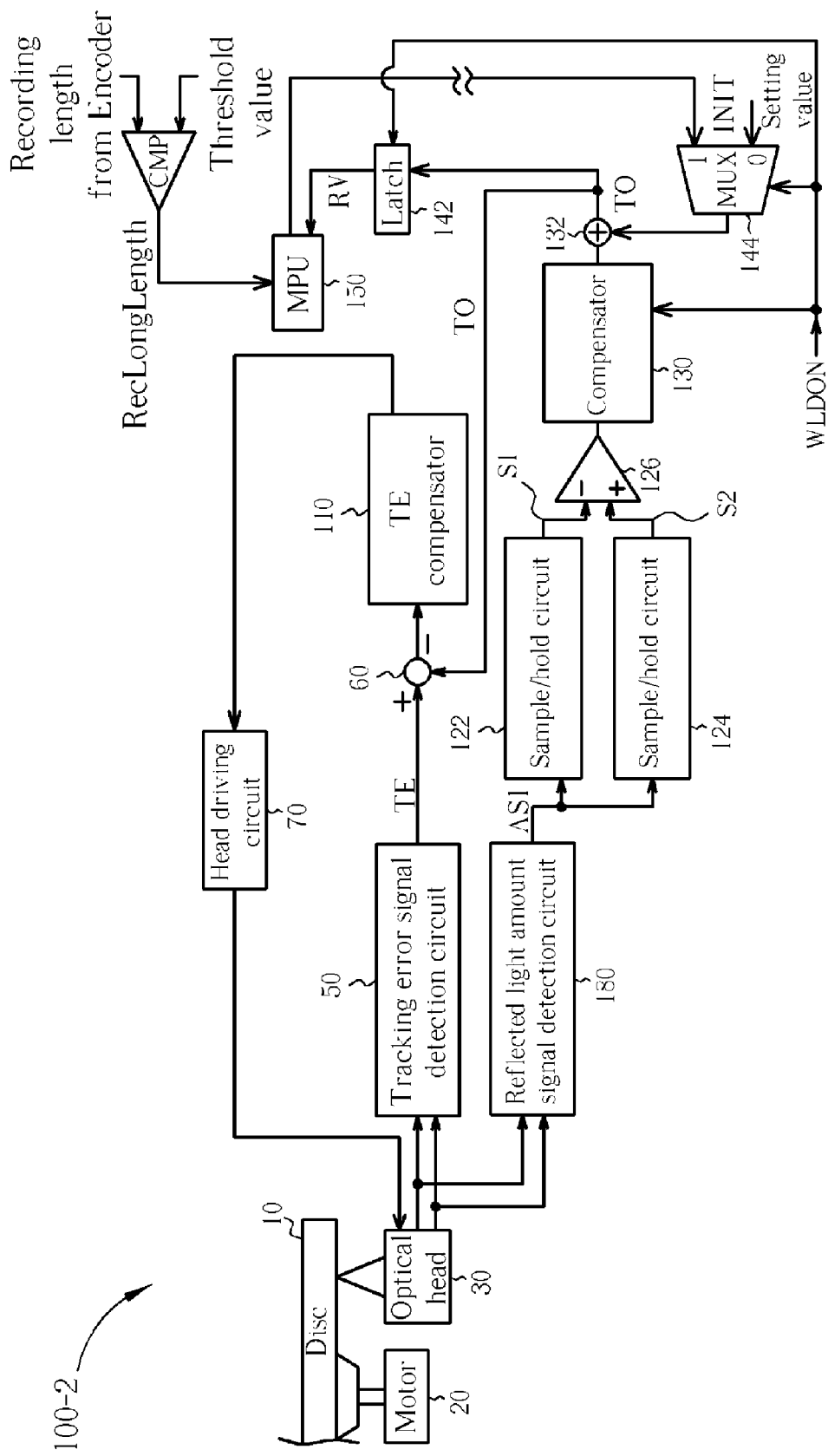
FIG. 12 is a diagram of an optical storage device according to a second embodiment of the present invention, where the second embodiment is a variation of the first embodiment.

FIG. 12 is a diagram of an optical storage device 100-2 according to a second embodiment of the present invention. The second embodiment is a variation of the first embodiment. Differences between the second embodiment and the first embodiment can be described as follows. As shown in FIG. 12, a comparator (labeled "CMP") compares a recording length with a threshold value to generate a flag RecLongLength, wherein the flag represents whether the recording length is a long recording length or not. Namely, the flag RecLongLength is used to represent whether the recording length is longer or shorter than the threshold value.

In addition, the recording length is sent from an encoder (not shown) of the optical storage device 100-2, and the threshold value is set or received by the optical storage device 100-2. For example, the threshold value represents a threshold of ten tracks. If the recording length is greater than the threshold value, the flag RecLongLength is set as a logical value of "1" in order to indicate that the recording length is a long recording length; otherwise, the flag RecLongLength is set as a logical value of "0" in order to indicate that the recording length is not a long recording length. The flag RecLongLength shown in FIG. 12 is utilized for determining whether to send out the readout value (which is derived from the readout value signal RV) to be utilized as the initial value INIT for the recording process performed later, wherein the flag RecLongLength can be determined before or after the recording process.

Figure 13:
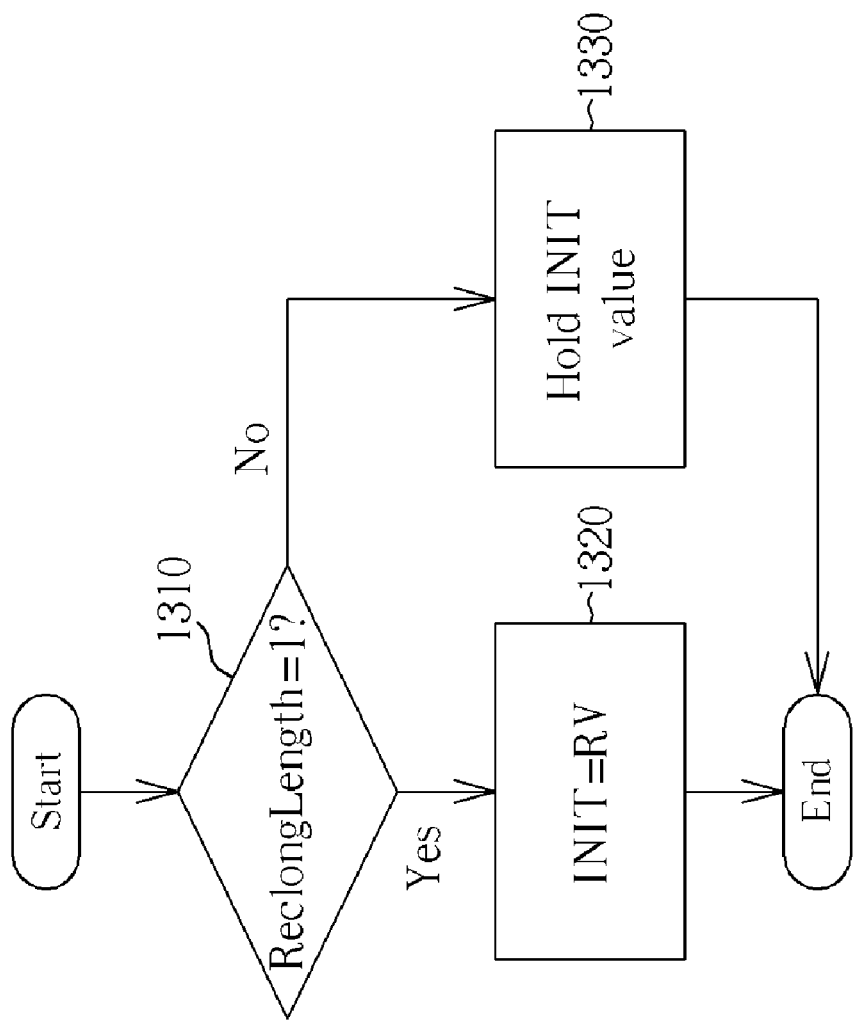
FIG. 13 illustrates a flowchart of a method applied to the optical storage device shown in FIG. 12.

Thus, referring to a flowchart as shown in FIG. 13, at the end of a recording process, the MPU 150 may operate according to the notification of the flag RecLongLength for determining whether to set INIT as RV or hold the value of INIT to be unvaried. In Step 1310, the MPU 150 checks whether the flag RecLongLength is set as the logical value of "1". If the flag RecLongLength is set as the logical value of "1", Step 1320 is entered, so the MPU 150 sets INIT as RV; otherwise (i.e. the flag RecLongLength is set as the logical value of "0"), Step 1330 is entered, so the MPU 150 holds the value of INIT to be unvaried.

Accordingly, at the end of recording data onto the optical storage medium, when the flag RecLongLength indicates that the recording length is a long recording length, the MPU 150 may update the initial value INIT for being utilized in another recording process performed later with the readout value RV. On the contrary, when the flag RecLongLength indicates that the recording length is not a long recording length, the MPU 150 may hold the initial value INIT to be unvaried. As a result, the track offset control loop may utilize the initial value INIT derived as mentioned to set the recording track offset before the recording process performed later or in the beginning of the recording process performed later. Therefore, the problems (such as erroneous track offset closed loop control when $I_1/I_2$ path unbalance exists and groove or land tracks are utilized most of the time) that typically occur when the recording length is short can be prevented according to this embodiment. Similar descriptions for this embodiment are not repeated in detail.

Figure 14:
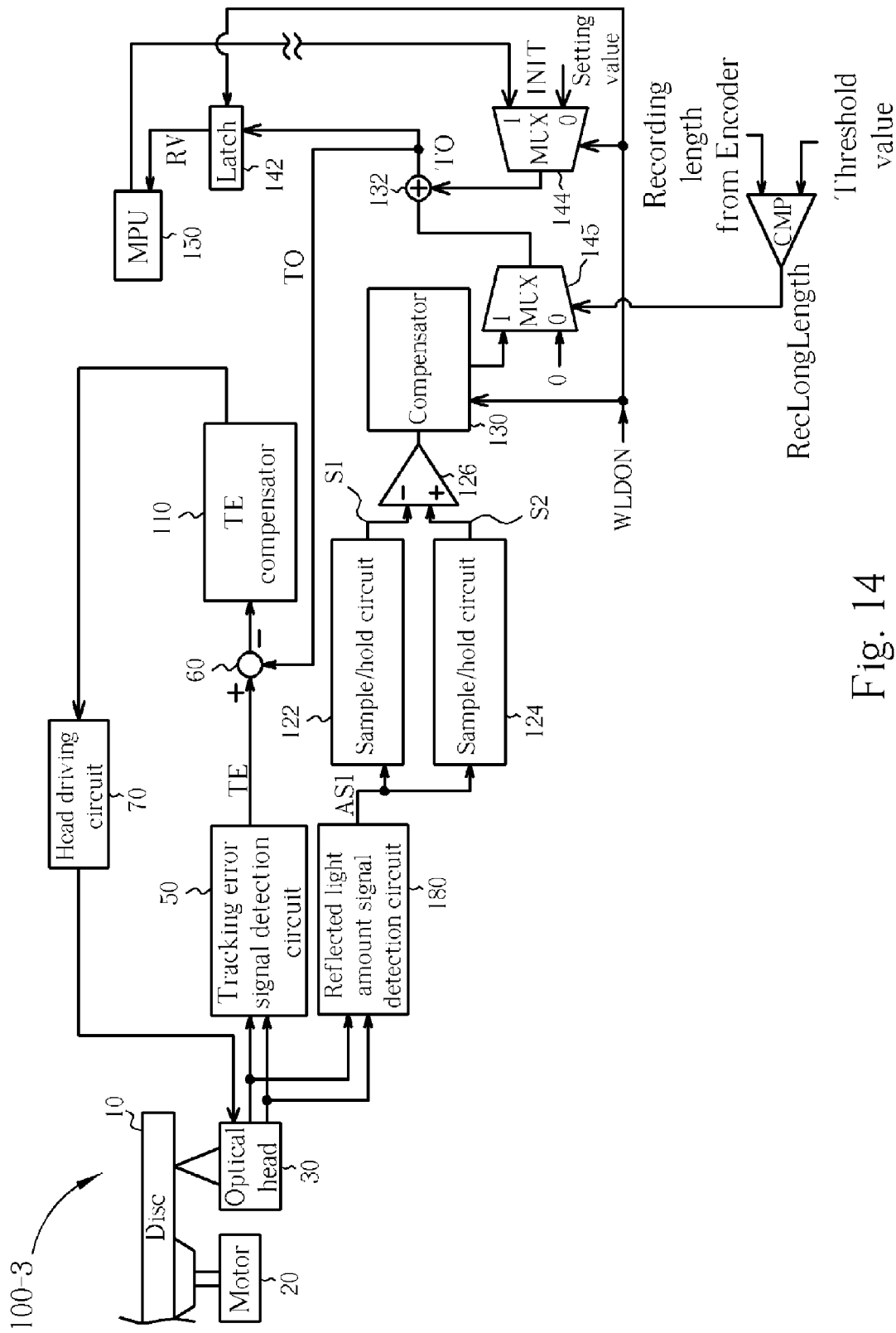
FIG. 14 is a diagram of an optical storage device according to a third embodiment of the present invention, where the third embodiment is a variation of the first embodiment.

FIG. 14 is a diagram of an optical storage device 100-3 according to a third embodiment of the present invention, where the third embodiment is a variation of the first embodiment and also a variation of the second embodiment. As shown in FIG. 14, the comparator (labeled "CMP") in the second embodiment is utilized for controlling a multiplexer 145 inserted between the compensator 130 and the arithmetic unit 132. Thus, when the flag RecLongLength is set as the logical value of "1", the arithmetic unit 132 is coupled to the compensator 130 as in the first embodiment; otherwise (i.e. the flag RecLongLength is set as the logical value of "0"), the arithmetic unit 132 is coupled to a zero input.

According to the third embodiment of FIG. 14, before starting the recording process, the flag RecLongLength must be determined, and is set as the logical value of "1" or the logical value of "0" by utilizing the comparator (labeled "CMP") in advance. Thus, comparing to the embodiment shown in FIG. 12, the time for determining the flag RecLongLength of the embodiment shown in FIG. 14 is stricter.

The multiplexer 145 is inserted between the compensator 130 and the arithmetic unit 132. Thus, before starting the recording process, when the flag RecLongLength indicates that the recording length sent from the encoder (e.g. a value of the recording length corresponding to the present recording process) is not a long recording length, the arithmetic unit 132 injects signal 0, and the track offset control loop holds the recording track offset to be the initial value INIT. On the contrary, when the flag RecLongLength indicates that the recording length sent from the encoder (e.g. a value of the recording length corresponding to the present recording process) is a long recording length, the arithmetic unit 132 injects the compensation result from the compensator 130 and the track offset control loop operates normally without holding the recording track offset to be the initial value INIT. Similar descriptions for this embodiment are not repeated in detail.

According to a variation of the third embodiment, the multiplexer 145 coupled to the comparator (labeled "CMP") in the third embodiment can be inserted between the differential circuit 126 and the compensator 130 for achieving similar operation result(s) as the third embodiment. That is, the multiplexer 145 is coupled between the differential circuit 126 and the compensator 130. Thus, the multiplexer 145 multiplexes the difference calculated by the differential circuit 126 or a zero input as an output according to the flag RecLongLength, and the compensator 130 controls the recording track offset according to the output of the multiplexer 145. Similar descriptions for this variation are not repeated in detail.

According to the two embodiments shown in FIG. 12 and FIG. 14, the present invention systems and methods conquer some erroneous control problems (e.g. the problem that the online recording track offset closed loop traces toward an unwanted direction, causing the laser light spot not to be aligned at the center of a track). For example, the present invention can be applied to a random write operation which has a small recording length.

Figure 15:
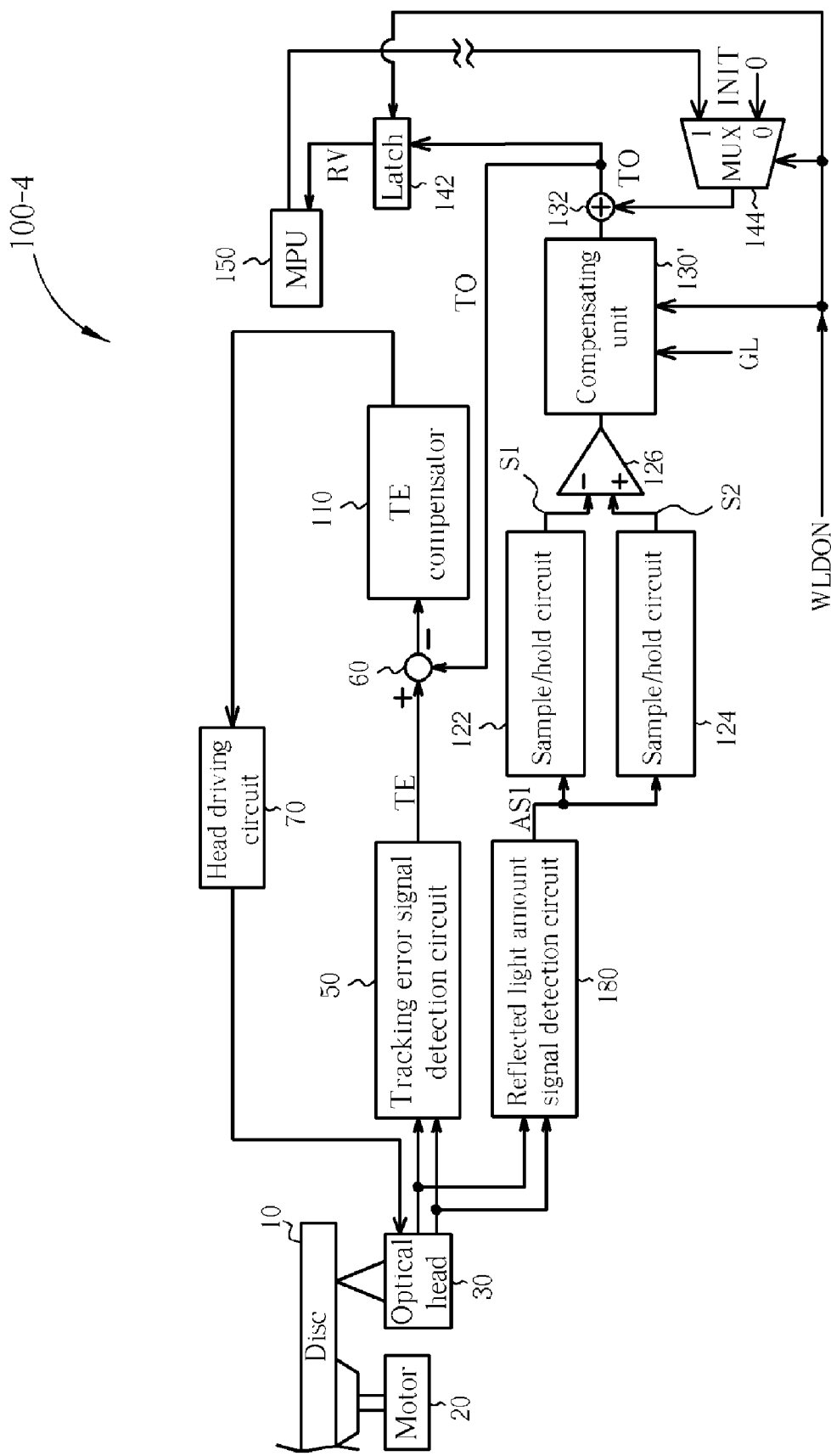
FIG. 15 is a diagram of an optical storage device according to a fourth embodiment of the present invention, where the fourth embodiment is a variation of the first embodiment.

FIG. 15 is a diagram of an optical storage device 100-4 according to a fourth embodiment of the present invention, where the fourth embodiment is also a variation of the first embodiment. The architecture in this embodiment works well no matter whether the erroneous control problems mentioned above exist or not. Differences between the fourth embodiment and the first embodiment can be described as follows. The compensator 130 mentioned above is replaced with a compensating unit 130'. The compensating unit 130' of this embodiment comprises the compensator 130 and other components (such as switches) for controlling the connection status of an input terminal of the compensator 130, where implementation details of the compensating unit 130' will be described later. The switching status of two switches can be determined according to a groove/land signal GL. As a result, the groove/land signal GL can be utilized with some other components for controlling the compensator 130 within the compensating unit 130' to be coupled to the differential circuit 126 for a specific period (e.g. a short period) every two tracks.

Figure 16:
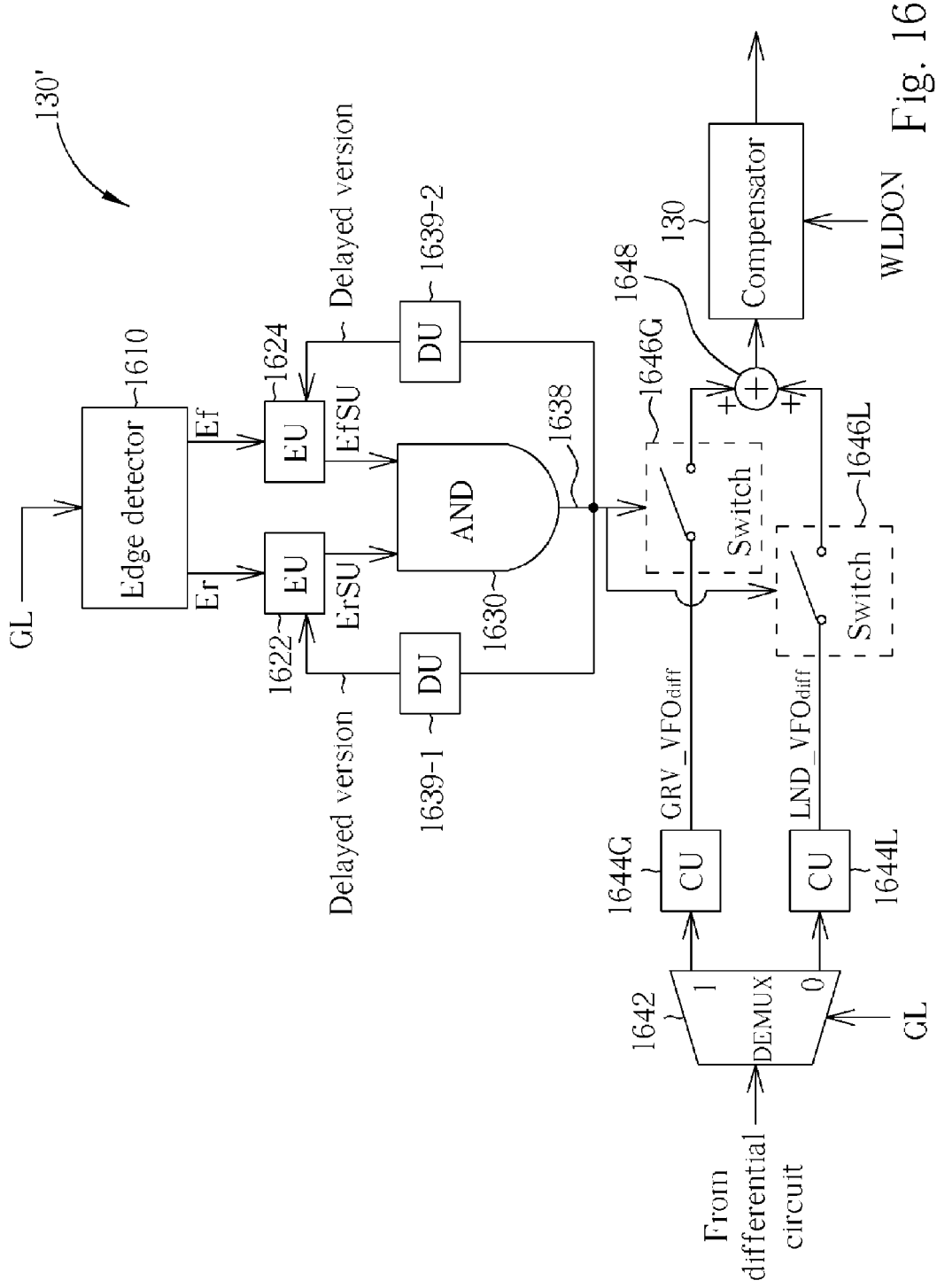
FIG. 16 illustrates implementation details of the compensating unit shown in FIG. 15 according to an embodiment of the present invention.

FIG. 16 illustrates the implementation details of the compensating unit 130' shown in FIG. 15 according to an embodiment of the present invention. As shown in FIG. 16, in addition to the compensator 130 and the switches 1646G and 1646L representing the two switches mentioned above, the compensating unit 130' further comprises an edge detector 1610, two extension units 1622 and 1624 (labeled "EU"), an AND gate 1630, at least one delay unit such as delay units 1639-1 and 1639-2 (labeled "DU"), a demultiplexer 1642 (labeled "DEMUX"), two calculation units 1644G and 1644L (labeled "CU"), and an arithmetic unit such as an adder 1648. The arithmetic unit is utilized for deriving a linear combination of the inputs thereof. Since the arithmetic unit in this embodiment is the adder 1648, the linear combination represents the sum of the inputs of the adder 1648.

Figure 17:
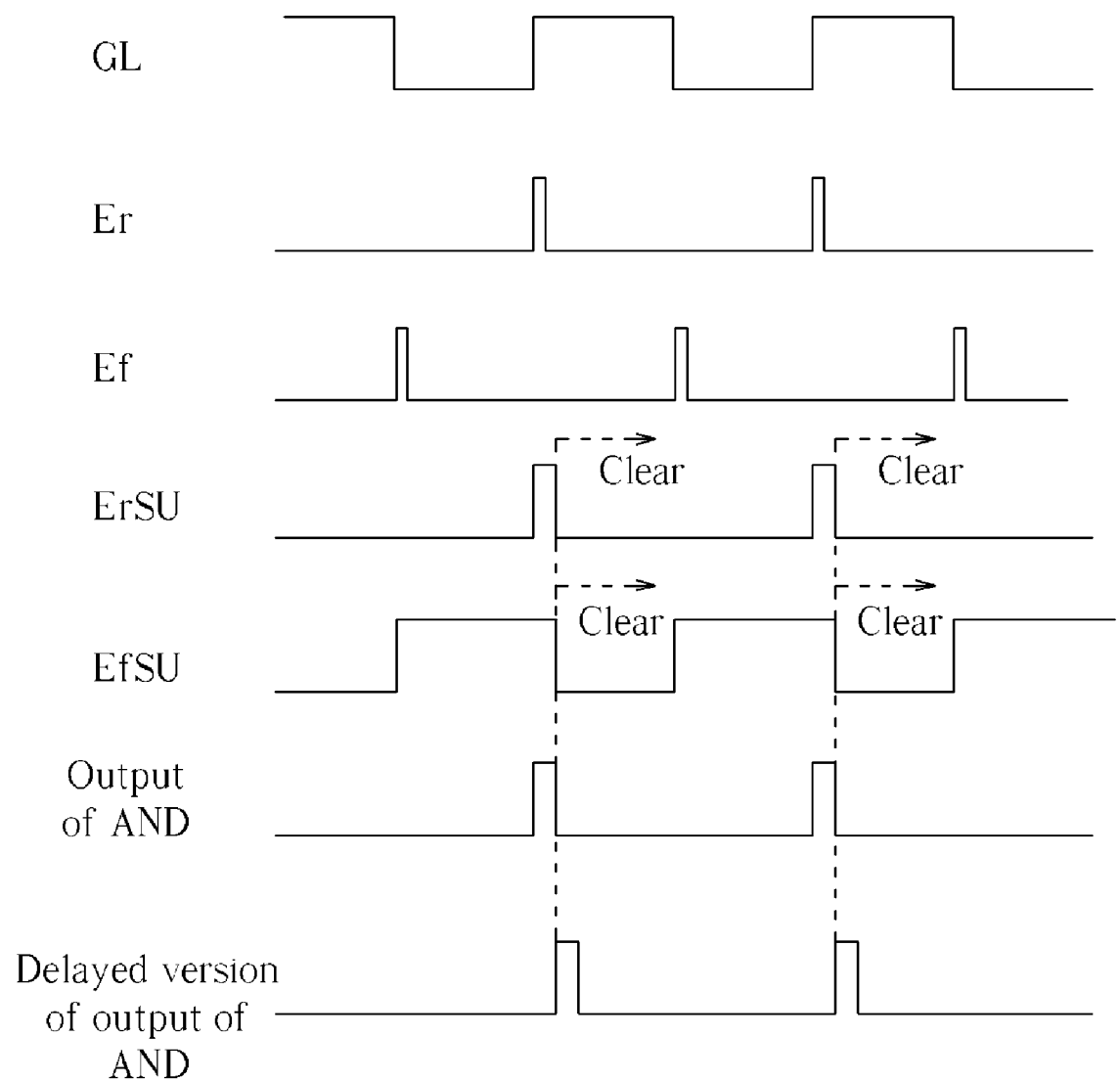
FIG. 17 and FIG. 18 illustrate related signals of the compensating unit shown in FIG. 15 according to the embodiment shown in FIG. 16.
Figure 18:
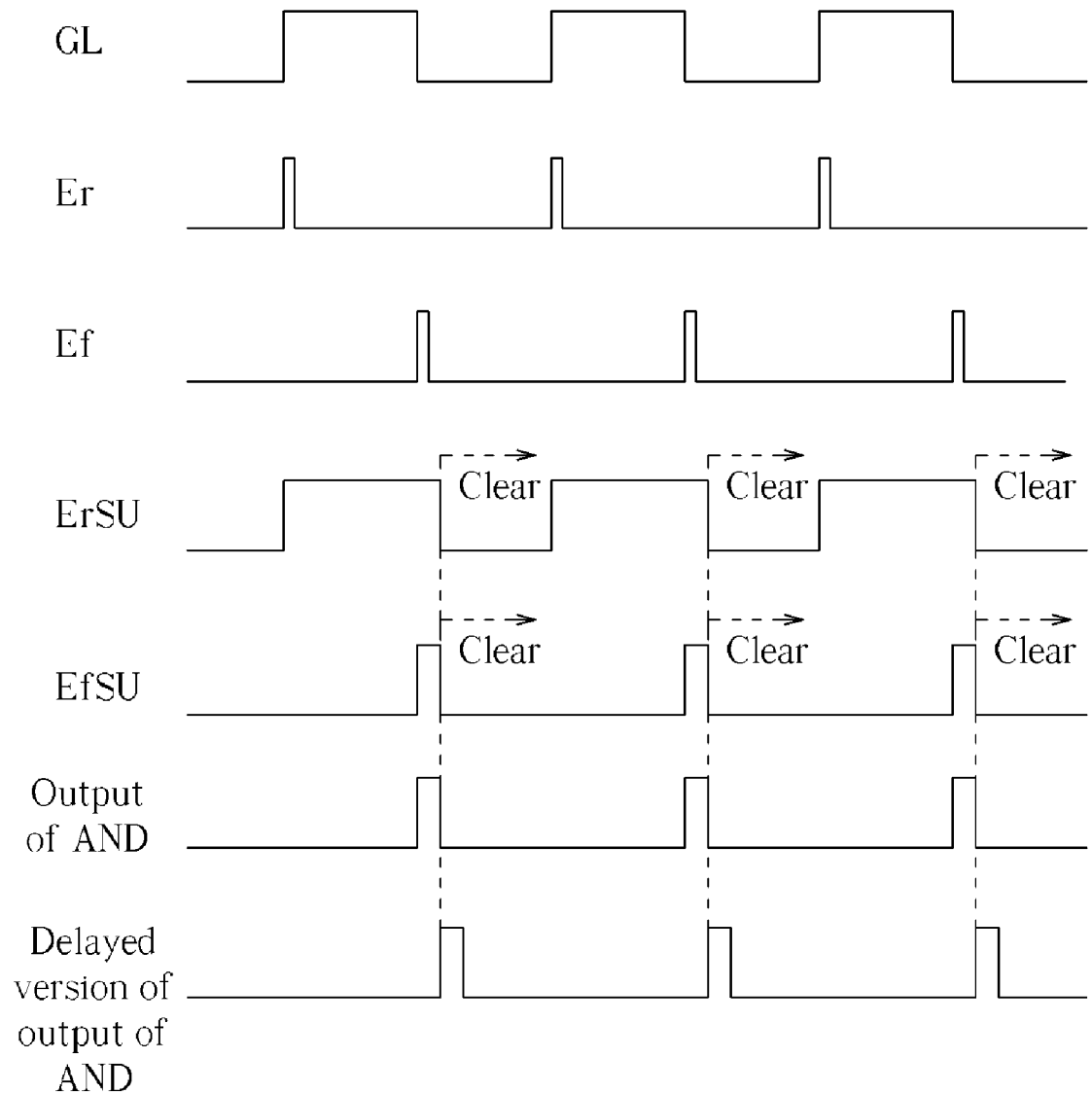

FIG. 17 and FIG. 18 illustrate related signals of the compensating unit 130' shown in FIG. 15 according to the embodiment shown in FIG. 16. FIG. 17 corresponds to a situation when the first edge of the groove/land signal GL is a falling edge, and FIG. 18 corresponds to a situation when the first edge of the groove/land signal GL is a rising edge. According to this embodiment, the edge detector 1610 detects edges of the groove/land signal GL to generate detection results and output the detection results through detection result signals Er and Ef, where the detection results respectively carried by the detection result signals Er and Ef (i.e. the pulses of the detection result signals Er and Ef) represent detected rising edges and detected falling edges, respectively.

In addition, the two extension units 1622 and 1624 respectively hold the detection results carried by the detection result signals Er and Ef to generate intermediate signals ErSU and EfSU such as those shown in FIG. 17 or FIG. 18. The AND gate 1630 may perform an AND operation according to the intermediate signals ErSU and EfSU to generate an output (labeled "Output of AND" in FIG. 17 and FIG. 18) such as a switching signal 1638 for controlling the switches 1646G and 1646L, and therefore the held values of the detection results respectively stored in the two extension units 1622 and 1624 are cleared by a delayed version of the switching signal 1638 when the delayed version of the switching signal 1638 corresponds to a logical value "1".

The delay units 1639-1 and 1639-2 delay the switching signal 1638 with a delay amount to generate the delayed version of the switching signal 1638, where the delay amount is properly designed according to theoretical calculations or trial experiments. As a result, a rising edge of a delayed pulse in the delayed version is aligned to a falling edge of the corresponding pulse in the switching signal 1638. Thus, the two extension units 1622 and 1624 are reset whenever a delayed pulse in the delayed version of the switching signal 1638 appears.

Additionally, when the switching signal 1638 corresponds to a logical value "1", the switches 1646G and 1646L couple the adder 1648 to the differential circuit 126 through the demultiplexer 1642 (labeled "DEMUX") with the calculation units 1644G or 1644L, so that the compensator 130 is coupled to the output of the differential circuit 126 through these intermediate components shown in FIG. 16. Otherwise when the switching signal 1638 corresponds to a logical value "0", the switches 1646G and 1646L disconnect the inputs of the adder 1648 from the calculation units 1644G and 1644L, respectively.

Please note that the appearance of the pulses of the output of AND shown in FIG. 17 corresponds to rising edges of the groove/land signal GL, and the appearance of the pulses of the output of AND shown in FIG. 18 corresponds to falling edges of the groove/land signal GL. Thus, no matter whether the first edge of the groove/land signal GL is a falling edge (i.e. the situation shown in FIG. 17) or a rising edge (i.e. the situation shown in FIG. 18), the waveforms of the output of AND have pulses every two tracks.

In this embodiment, a high level of the groove/land signal GL represents a groove track, and a low level of the groove/land signal GL represents a land track. As a result, in the situation shown in FIG. 17, the switching signal 1638 (i.e. the output of AND shown in FIG. 17) triggers the switches 1646G and 1646L at the beginning of subsequent groove tracks. In addition, in the situation shown in FIG. 18, the switching signal 1638 (i.e. the output of AND shown in FIG. 18) triggers the switches 1646G and 1646L at the beginning of subsequent land tracks. In a variation of this embodiment, although the meanings of levels of the groove/land signal GL can be exchanged, the waveforms of the output of AND still have pulses every two tracks.

After explaining the switching operations of the switches 1646G and 1646L, the components on the path(s) from the differential circuit 126 to the compensator 130 are further explained as follows.

The demultiplexer 1642 demultiplexes the output of the differential circuit 126 according to the groove/land signal GL, where the output of the differential circuit 126 represents the difference between the peak-to-peak values IVFO1 and IVFO3 in this embodiment. When the groove/land signal GL is at the high level (i.e. the logical value of "1" in this embodiment), meaning the laser light spot has moved to a specific groove track, the demultiplexer 1642 forwards the output of the differential circuit 126 through an output end labeled "1" to the calculation unit 1644G. Thus, the calculation unit 1644G performs a statistical calculation according to the difference between the peak-to-peak values IVFO1 and IVFO3 of each sector of the specific groove track to generate a value GRV_VFOdiff. For example, the calculation unit 1644G derives the value GRV_VFOdiff by calculating the maximum of the differences between the peak-to-peak values IVFO1 and IVFO3 corresponding to all (or some) sectors of the specific groove track.

On the other hand, when the groove/land signal GL is at the low level (i.e. the logical value of "0" in this embodiment), meaning the laser light spot has moved to a specific land track, the demultiplexer 1642 forwards the output of the differential circuit 126 through an output end labeled "0" to the calculation unit 1644L. Thus, the calculation unit 1644L performs a statistical calculation according to the difference between the peak-to-peak values IVFO1 and IVFO3 of each sector of the specific land track to generate a value LND_VFOdiff. For example, the calculation unit 1644L derives the value LND_VFOdiff by calculating the maximum of the differences between the peak-to-peak values IVFO1 and IVFO3 corresponding to all (or some) sectors of the specific land track.

According to this embodiment, in the situation shown in FIG. 17, the switching signal 1638 triggers the switches 1646G and 1646L at the beginning of subsequent groove tracks. In addition, in the situation shown in FIG. 18, the switching signal 1638 triggers the switches 1646G and 1646L at the beginning of subsequent land tracks. Therefore, regarding every two tracks, the adder 1648 may sum up the values GRV_VFOdiff and LND_VFOdiff to generate a sum inputted into the compensator 130 for operation.

The fourth embodiment can be further described by referring to FIG. 10 or FIG. 11. Referring to FIG. 10, when the laser light spot emitted from the optical head 30 is centered at line (a1) (e.g. regarding the specific groove track), the peak-to-peak value IVFO1 is greater than the peak-to-peak value IVFO3, so the value GRV_VFOdiff is greater than zero. Referring to FIG. 11, when the laser light spot emitted from the optical head 30 is centered at line (a2) (e.g. regarding the specific land track), the peak-to-peak value IVFO1 is less than the peak-to-peak value IVFO3, so the value LND_VFOdiff is less than zero. As a result, the sum of the values GRV_VFOdiff and LND_VFOdiff may approach or reach zero, and therefore, the track offset will not be adjusted by the track offset control loop.

In addition, referring to FIG. 10, when the laser light spot is centered at line (b1), the peak-to-peak value IVFO1 is surely greater than the peak-to-peak value IVFO3, so the value GRV_VFOdiff is greater than zero. Referring to FIG. 11, when the laser light spot is centered at line (b2), however, the absolute value of the value LND_VFOdiff (e.g. the maximum of the differences between the peak-to-peak values IVFO1 and IVFO3 corresponding to all or some sectors of the specific land track in this embodiment) is reduced due to the signal amplitude of the $I_1$ path being greater than the signal amplitude of the $I_2$ path, in contrast to the situation where the laser light spot is centered at line (b0) shown in FIG. 9. As a result, the sum of the values GRV_VFOdiff and LND_VFOdiff is greater than zero, and therefore, the track offset will be adjusted by the track offset control loop in a correct direction.

Additionally, referring to FIG. 11, when the laser light spot is centered at line (c2), the peak-to-peak value IVFO1 is surely less than the peak-to-peak value IVFO3, so the value LND_VFOdiff is less than zero. Referring to FIG. 10, when the laser light spot is centered at line (c1), however, the absolute value of the value GRV_VFOdiff (e.g. the maximum of the differences between the peak-to-peak values IVFO1 and IVFO3 corresponding to all or some sectors of the specific groove track in this embodiment) is reduced due to the signal amplitude of the $I_1$ path being greater than the signal amplitude of the $I_2$ path, in contrast to the situation where the laser light spot is centered at line (c0) shown in FIG. 9. As a result, the sum of the values GRV_VFOdiff and LND_VFOdiff is less than zero, and therefore, the track offset will be adjusted by the track offset control loop in a correct direction. Similar descriptions for this embodiment are not repeated in detail.

According to a variation of the embodiment shown in FIG. 16, the calculations of the calculation units 1644G and 1644L can be varied. For example, the calculation unit 1644G derives the value GRV_VFOdiff by calculating the minimum of the differences between the peak-to-peak values IVFO1 and IVFO3 corresponding to all (or some) sectors of the specific groove track, and the calculation unit 1644L derives the value LND_VFOdiff by calculating the minimum of the differences between the peak-to-peak values IVFO1 and IVFO3 corresponding to all (or some) sectors of the specific land track. Similar descriptions for this variation are not repeated in detail.

According to another variation of the embodiment shown in FIG. 16, the calculation unit 1644G derives the value GRV_VFOdiff by calculating an average of the differences between the peak-to-peak values IVFO1 and IVFO3 corresponding to all (or some) sectors of the specific groove track, and the calculation unit 1644L derives the value LND_VFOdiff by calculating an average of the differences between the peak-to-peak values IVFO1 and IVFO3 corresponding to all (or some) sectors of the specific land track. Thus, according to this variation, the adder 1648 may sum up the value GRV_VFOdiff derived from averaging the differences corresponding to all (or some) sectors of a groove track and the value LND_VFOdiff derived from averaging the differences corresponding to all (or some) sectors of a land track adjacent to this groove track to generate a sum inputted into the compensator 130 for operation. Similar descriptions for this variation are not repeated in detail.

According to another variation of the embodiment shown in FIG. 16, the calculation unit 1644G derives the value GRV_VFOdiff by performing a moving average operation on the differences between the peak-to-peak values IVFO1 and IVFO3 corresponding to all (or some) sectors of the specific groove track, and the calculation unit 1644L derives the value LND_VFOdiff by performing the moving average operation on the differences between the peak-to-peak values IVFO1 and IVFO3 corresponding to all (or some) sectors of the specific land track. The moving average operation calculates average values by averaging the samples (e.g. the differences mentioned above) dynamically, namely this operation drops the oldest sample and adds a new sample to get one of subsequently derived average values, and the average values derived from the moving average operation will be more precise than ordinary methods. Thus, according to this variation, the adder 1648 may sum up the value GRV_VFOdiff derived from moving-averaging the differences corresponding to all (or some) sectors of a groove track and the value LND_VFOdiff derived from moving-averaging the differences corresponding to all (or some) sectors of a land track adjacent to this groove track to generate a sum inputted into the compensator 130 for operation. Similar descriptions for this variation are not repeated in detail.

Figure 19:
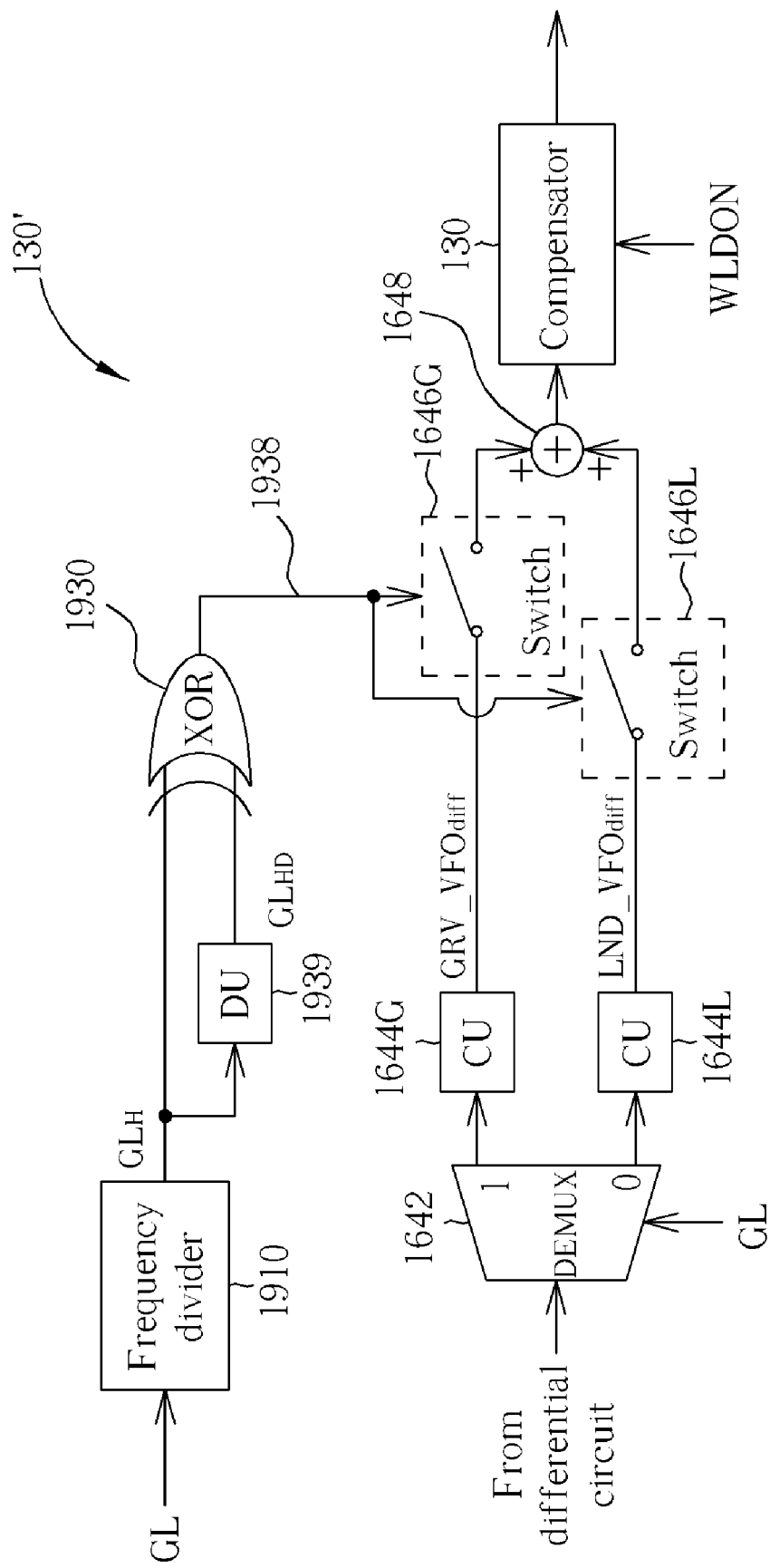
FIG. 19 illustrates implementation details of the compensating unit shown in FIG. 15 according to another embodiment of the present invention.
Figure 20:
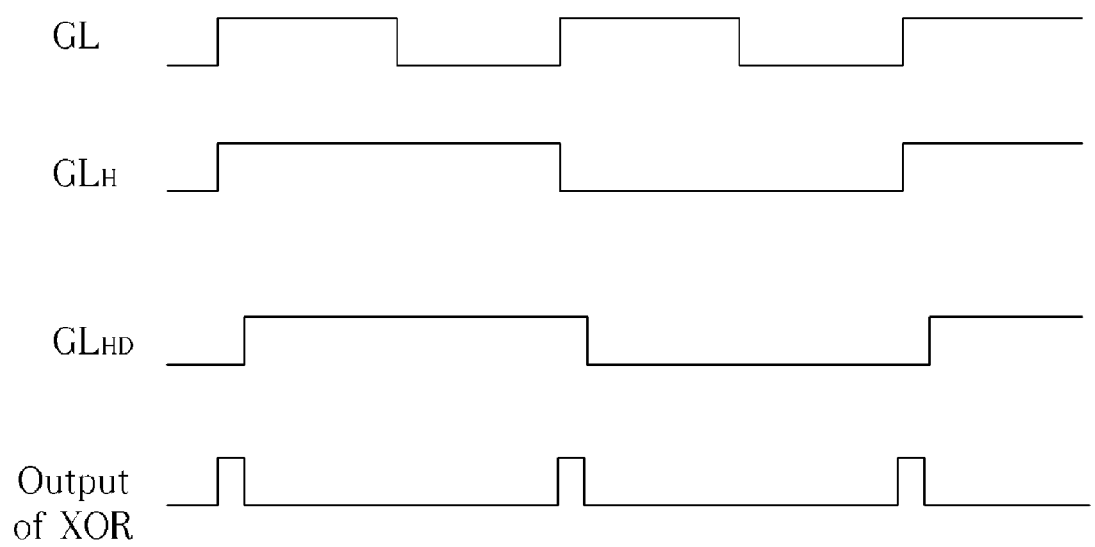
FIG. 20 and FIG. 21 illustrate related signals of the compensating unit shown in FIG. 15 according to the embodiment shown in FIG. 19.
Figure 21:
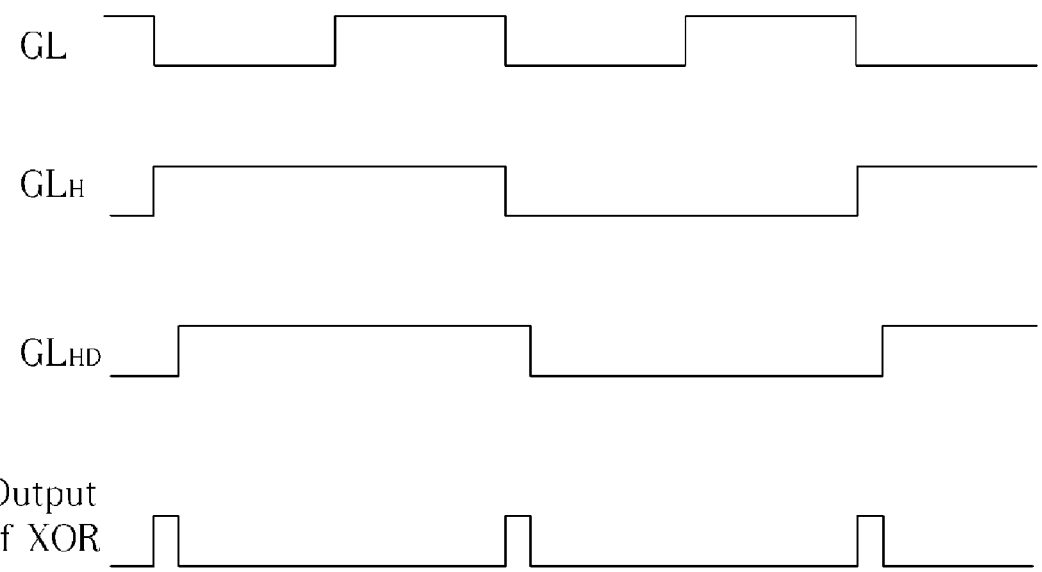

Please refer to FIG. 19 together with FIG. 20 and FIG. 21. FIG. 19 illustrates implementation details of the compensating unit 130' shown in FIG. 15 according to another embodiment of the present invention, where the embodiment shown in FIG. 19 is a variation of the embodiment shown in FIG. 16. FIG. 20 and FIG. 21 illustrate related signals of the compensating unit 130' shown in FIG. 15 according to the embodiment shown in FIG. 19. According to this embodiment, the switching signal 1638 mentioned above is replaced with a switching signal 1938, and the components for generating the switching signal 1638 are replaced with a frequency divider 1910, at least one delay unit such as a delay unit 1939 (labeled "DU"), and an XOR gate 1930 correspondingly.

No matter whether the first edge of the groove/land signal GL is a falling edge (i.e. the situation shown in FIG. 21) or a rising edge (i.e. the situation shown in FIG. 20), the frequency divider 1910 performs a frequency-dividing operation on the groove/land signal GL to generate a frequency-divided signal $GL_H$ as illustrated, where the ratio of the frequency of the frequency-divided signal $GL_H$ to the frequency of the groove/land signal GL is taken as ½ for example. The delay unit 1939 delays the frequency-divided signal $GL_H$ to generate a delayed version $GL_{HD}$ of the frequency-divided signal $GL_H$, as shown in FIG. 20 and FIG. 21. The XOR gate 1930 performs an XOR operation according to the frequency-divided signal $GL_H$ and the delayed version $GL_{HD}$ of the frequency-divided signal $GL_H$ to generate an output (labeled "Output of XOR" in FIG. 20 and FIG. 21) such as the switching signal 1938 for controlling the switches 1646G and 1646L. Similar descriptions for this embodiment are not repeated in detail.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for calibrating a recording track offset of an optical storage device accessing an optical storage medium of land/groove type, the system comprising:
    a tracking servo loop arranged to control tracking operations of an optical head of the optical storage device;
    a track offset control loop arranged to control the recording track offset for the tracking servo loop;
    a controller arranged to enable a latest value of the recording track offset to be a readout value for utilization in a recording process performed later, wherein the latest value is derived from the track offset control loop; and
    a comparator, coupled to the controller, comparing a recording length with a threshold value to generate a flag representing whether the recording length is a long recording length;
    wherein the controller determines whether to update an initial value used in the track offset control loop according to the flag.

2. The system of claim 1, wherein when the flag indicates that the recording length is a long recording length, the controller updates the initial value used in the track offset control loop with the readout value to be utilized in the recording process performed later.

3. The system of claim 2, wherein the controller further sets the initial value to be an initial track offset utilized by the track offset control loop before or in the beginning of the recording process performed later.

4. The system of claim 1, wherein when the flag indicates that the recording length is not a long recording length, the controller holds the initial value to be unvaried.

5. The system of claim 1, further comprising:
    a multiplexer arranged to multiplex an initial value or a setting value as an output that is utilized by the track offset control loop to set the recording track offset before the recording process performed later or in the beginning of the recording process performed later.

6. The system of claim 1, wherein the tracking servo loop comprises:
    a tracking error signal detection circuit arranged to generate a tracking error signal according to a reproduced signal from the optical head;
    a tracking error compensator arranged to perform compensation according to the control parameter, in order to control the radial location of the optical head according to the tracking error signal; and
    a head driving circuit arranged to drive the optical head according to an output of the tracking error compensator.

7. The system of claim 1, wherein the track offset control loop comprises:
    a reflected light amount signal detection circuit arranged to generate a reflected light amount signal according to at least one output from the optical head;
    a plurality of sample/hold circuits arranged to sample/hold the reflected light amount signal, and generate a plurality of outputs, respectively;
    a differential circuit arranged to calculate a difference between the outputs from the sample/hold circuits; and
    a compensator for controlling the recording track offset according to the difference.

8. The system of claim 7, further comprising:
a multiplexer arranged to multiplex an output of the compensator or a zero input according to the flag.

9. The system of claim 7, further comprising:
a multiplexer arranged to multiplex the difference or a zero input as an output according to the flag;
wherein the compensator is coupled to the multiplexer, and is arranged to control the recording track offset according to the output of the multiplexer.

10. A system for calibrating a recording track offset of an optical storage device accessing an optical storage medium of land/groove type, the system comprising:
a tracking servo loop arranged to control tracking operations of an optical head of the optical storage device;
a track offset control loop arranged to control the recording track offset for the tracking servo loop, the track offset control loop comprising a compensating unit arranged to control the recording track offset by performing a statistical calculation according to a plurality of differences calculated within the track offset control loop; and
a controller arranged to enable a latest value of the recording track offset to be a readout value for utilization in a recording process performed later, wherein the latest value is derived from the track offset control loop;
wherein the compensating unit controls the recording track offset according to a linear combination of a plurality of statistical calculation results from the statistical calculation.

11. The system of claim 10, wherein the controller is capable of updating an initial value used in the track offset control loop with the readout value to be utilized in the recording process performed later.

12. The system of claim 11, wherein the controller further sets the initial value to be an initial track offset utilized by the track offset control loop before or in the beginning of the recording process performed later.

13. The system of claim 10, wherein the tracking servo loop comprises:
a tracking error signal detection circuit arranged to generate a tracking error signal according to a reproduced signal from the optical head;
a tracking error compensator arranged to perform compensation according to a control parameter, in order to control the radial location of the optical head according to the tracking error signal; and
a head driving circuit arranged to drive the optical head according to an output of the tracking error compensator.

14. The system of claim 10, wherein the track offset control loop further comprises:
a reflected light amount signal detection circuit arranged to generate a reflected light amount signal according to at least one output from the optical head;
a plurality of sample/hold circuits arranged to sample/hold the reflected light amount signal to generate a plurality of outputs, respectively; and
a differential circuit arranged to calculate a difference between the outputs from the sample/hold circuits to be one of the plurality of differences.

15. The system of claim 10, wherein the compensating unit comprises:
an arithmetic unit arranged to derive the linear combination of the statistical calculation results from the statistical calculation;
a compensator arranged to control the recording track offset according to the linear combination of the statistical calculation results; and
two switches arranged to provide the arithmetic unit with the linear combination of the statistical calculation results every two tracks according to a groove/land signal.

16. The system of claim 15, wherein the track offset control loop is utilized for controlling the switches, and further comprises:
an edge detector arranged to detect edges of the groove/land signal to generate detection results respectively representing a detected rising edge and a detected falling edge;
two extension units arranged to hold the detection results, respectively; and
an AND gate arranged to perform an AND operation according to the detection results from the extension units to generate a switching signal for controlling the switches;
wherein the detection results held by the extension units are capable of being cleared by a delayed version of the switching signal.

17. The system of claim 15, wherein the track offset control loop is utilized for controlling the switches, and further comprises:
a frequency divider arranged to perform a frequency-dividing operation on the groove/land signal to generate a frequency-divided signal; and
an XOR gate arranged to perform an XOR operation according to the frequency-divided signal and a delayed version of the frequency-divided signal to generate a switching signal for controlling the switches.

18. The system of claim 10, wherein the compensating unit comprises:
a demultiplexer arranged to demultiplex the differences calculated within the track offset control loop; and
two calculation units arranged to perform the statistical calculation according to the differences demultiplexed by the demultiplexer to generate the plurality of statistical calculation results.

19. A method for calibrating a recording track offset of an optical storage device accessing an optical storage medium of land/groove type, the method comprising:
saving a latest value of the recording track offset to be a readout value for utilization in a recording process performed later, wherein the latest value is derived from a track offset control loop of the optical storage device; and
comparing a recording length with a threshold value and determining whether to update an initial value according to whether the recording length is longer than the threshold value;
wherein the initial value is used in the track offset control loop of the optical storage device.

20. The method of claim 19, wherein when the recording length is longer than the threshold value, the initial value is updated by the readout value for being utilized in the recording process performed later.

21. The method of claim 19, wherein when the recording length is shorter than the threshold value, the initial value is kept for being utilized in the recording process performed later.

22. The method of claim 19, wherein the step of comparing the recording length with the threshold value further comprises generating a flag, wherein the flag represents whether the recording length is longer than the threshold value; and the method further comprises:

utilizing a compensator within the track offset control loop to control the recording track offset according to a difference derived within the track offset control loop; and multiplexing an output of the compensator or a zero input according to the flag.

23. The method of claim 19, wherein the step of comparing the recording length with the threshold value further comprises generating a flag, wherein the flag represents whether the recording length is longer than the threshold value; and the method further comprises:

multiplexing a difference that is derived within the track offset control loop or a zero input as a multiplexer output according to the flag; and utilizing a compensator within the track offset control loop to control the recording track offset according to the multiplexer output.

24. A method for calibrating a recording track offset of an optical storage device accessing an optical storage medium of land/groove type, the method comprising:

saving a latest value of the recording track offset to be a readout value for utilization in a recording process performed later, wherein the latest value is derived from a track offset control loop of the optical storage device; and controlling the recording track offset by performing a statistical calculation according to a plurality of differences calculated within the track offset control loop;

wherein the statistical calculation is performed by calculating at least one maximum/minimum/average of differences corresponding to sectors of a specific groove track, and by calculating at least one maximum/minimum/average of differences corresponding to sectors of a specific land track.

25. The method of claim 24, further comprising:

updating an initial value used in the track offset control loop with the readout value to be utilized in the recording process performed later.

26. The method of claim 24, wherein performing the statistical calculation according to the plurality of differences comprises:

calculating a maximum of the differences corresponding to the sectors of the specific groove track, and calculating a maximum of the differences corresponding to the sectors of the specific land track;

calculating a minimum of the differences corresponding to the sectors of the specific groove track, and calculating a minimum of the differences corresponding to the sectors of the specific land track;

calculating an average of the differences corresponding to the sectors of the specific groove track, and calculating an average of the differences corresponding to the sectors of the specific land track; or performing a moving average operation on the differences corresponding to the sectors of the specific groove track, and performing a moving average operation on the differences corresponding to the sectors of the specific land track.

* * * * *